United States Patent
Linger

(10) Patent No.: US 10,656,612 B2
(45) Date of Patent: May 19, 2020

(54) SAFETY UNIT AND AN IMPROVED SAFETY SYSTEM COMPRISING A NUMBER OF SAFETY UNITS

(71) Applicant: SSPN Safety System Products North AB, Onsala (SE)

(72) Inventor: Mats Linger, Onsala (SE)

(73) Assignee: SSPN SAFETY SYSTEM PRODUCTS NORTH AB, Onsala (SE)

(*) Notice: Subject to any disclaimer, the term of this patent is extended or adjusted under 35 U.S.C. 154(b) by 298 days.

(21) Appl. No.: 15/741,013

(22) PCT Filed: Jun. 21, 2016

(86) PCT No.: PCT/SE2016/050598
§ 371 (c)(1),
(2) Date: Dec. 29, 2017

(87) PCT Pub. No.: WO2017/003348
PCT Pub. Date: Jan. 5, 2017

(65) Prior Publication Data
US 2018/0188705 A1    Jul. 5, 2018

(30) Foreign Application Priority Data
Jun. 30, 2015 (SE) .................................. 1550919

(51) Int. Cl.
*G05B 19/042* (2006.01)

(52) U.S. Cl.
CPC ............ *G05B 19/0428* (2013.01); *G05B 2219/24186* (2013.01); *G05B 2219/24187* (2013.01);
(Continued)

(58) Field of Classification Search
CPC ..................................... G05B 19/042
See application file for complete search history.

(56) References Cited

U.S. PATENT DOCUMENTS

2002/0121433 A1  9/2002 Vogt
2007/0091518 A1* 4/2007 Pullmann ............. H01H 47/002
                                                       361/23

FOREIGN PATENT DOCUMENTS

DE      8315825 U1    3/1983
EP      1496411 A2    1/2005
(Continued)

OTHER PUBLICATIONS

European Patent Office, Int'l Search Report in PCT/SE2016/050598, dated Oct. 13, 2016.
(Continued)

*Primary Examiner* — Tejal Gami
(74) *Attorney, Agent, or Firm* — Jeffrey S. Melcher; Melcher Patent Law PLLC

(57) ABSTRACT

A programmable safety unit for monitoring and controlling safety functions of a hazardous environment, for example an environment including hazardous machines, processes, materials, and so forth and safety equipment associated with the hazardous environment. A safety unit is adapted for external mounting, and includes a programmable safety module and a connection part that are interconnectable enabling mounting/demounting and replacement of the programmable safety module and/or the connection part. The safety unit further includes at least two connections that are programmable as safe inputs and/or outputs for direct connection to at least a number of the safety functions or equipment of the hazardous environment, and for example the machines and/or processes.

20 Claims, 17 Drawing Sheets

(52) U.S. Cl.
CPC .............. *G05B 2219/24188* (2013.01); *G05B 2219/24189* (2013.01); *G05B 2219/24191* (2013.01)

(56) References Cited

FOREIGN PATENT DOCUMENTS

| EP | 1923759 | A2 | 5/2008 |
|----|---------|-----|--------|
| EP | 2637067 | A2 | 9/2013 |
| WO | 2005/101440 | A1 | 10/2005 |

OTHER PUBLICATIONS

European Patent Office, Written Opinion n PCT/SE2016/050598, dated Oct. 13, 2016.

\* cited by examiner

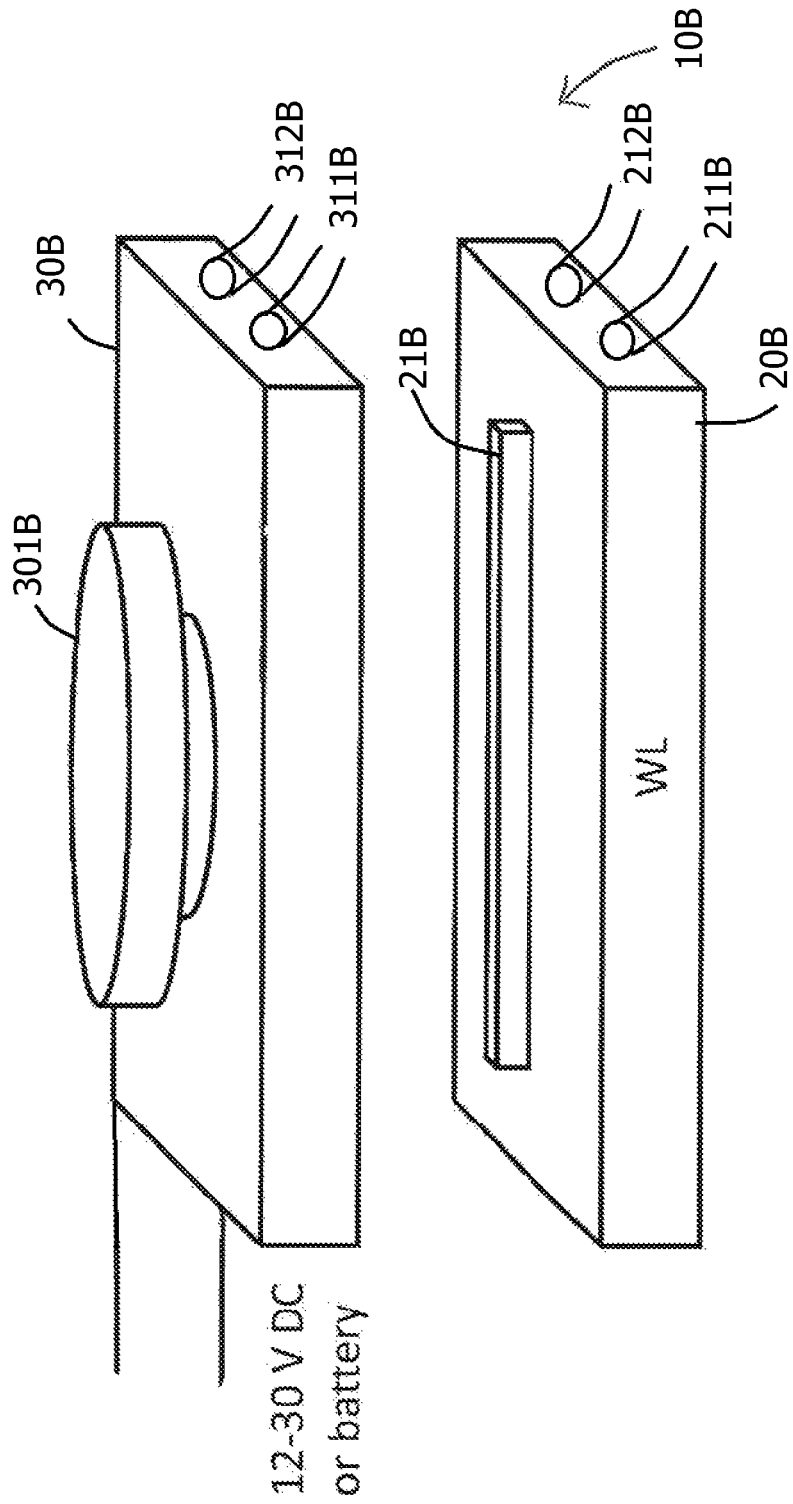

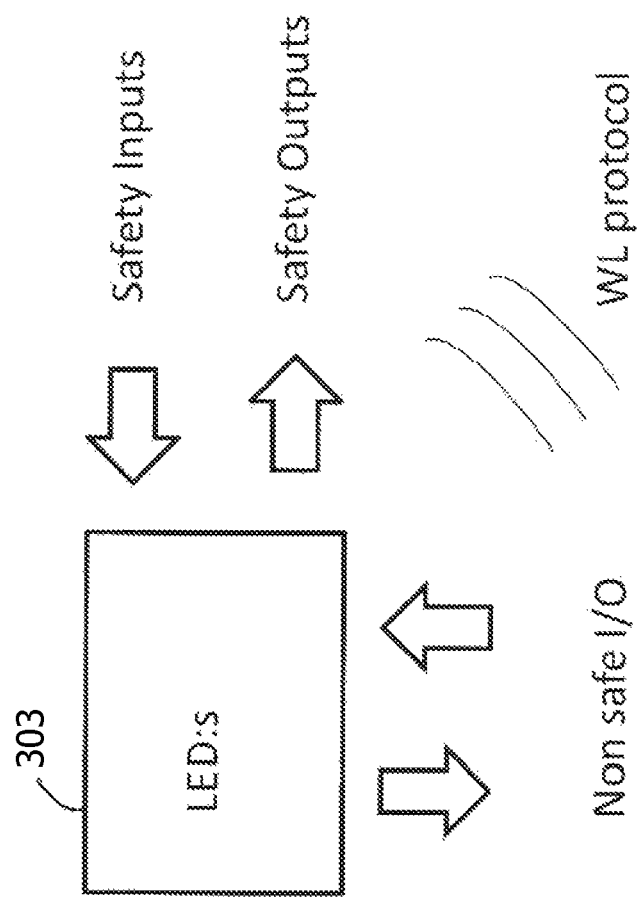

SAFETY UNIT AND AN IMPROVED SAFETY SYSTEM COMPRISING A NUMBER OF SAFETY UNITS

TECHNICAL FIELD

The present invention relates to a programmable safety unit for providing, maintaining and assuring safety in and/or around hazardous machines, processes or similar having the features of the first part of claim 1.

The invention also relates to a safety system having the features of the first part of claim 13.

The invention also relates to a method in a programmable safety system having the features of the first part of claim 19.

BACKGROUND

In order to prevent accidents in and around machines and processes safety devices are e.g. needed to detect people coming into an hazardous space, coming close to a machine in operation, being in an hazardous area when a machine is put into operation etc. It is also necessary that hazardous machines and processes can be stopped in a safe way before a person enters the hazardous space, or is in a hazardous space close to a machine, before, but also at occurrence, of an incident etc.

A simple safety system can be based on a fence around a machine and an interlocked gate. If the interlocked gate is opened all hazardous functions must be stopped. An interlocked gate has a safety sensor which detects if the gate is opened and it will give a signal to a safety unit which stops the hazardous machines and processes. If someone actually can enter the space inside the gate and close, it is a requirement that it is possible to verify that no one is inside the fence before a new start of the machine can be allowed. This can be done by means of a push button outside the gate placed such that there is a good overview of the hazardous space. This push button is called a reset. After the gate is closed, a reset has to be done which normally means to press and release the push button. The pressing and releasing is supervised by a safety unit connected to the push button. Sometime it is hard to see from the outside of the fence that no one is inside the fence. This can be solved by an extra supervised time reset push button inside the fence in order to make sure that somebody goes in to check that no one is inside. This inside reset starts a clock with a pre-settable time period before lapse of which the space has to be left, the gate closed and the other reset be pressed.

This is one way to make sure there is no one left inside the fence.

Normally there is also provided an emergency stop push button outside the fence. In such a case the complete safety function to stop and to allow restart of the hazardous machines and processes is based on the control and the supervision of the following safety devices: a sensor on the gate, a reset push button outside the fence, a time reset push button inside the fence and an emergency stop push button.

The control and the supervision are normally based on one or more safety units or modules provided inside a control cabinet. The safety units or modules can have a fixed function as well as a programmable function. On the market safety modules are e.g. named safety relays, safety PLCs (safety Programmable Logic Controller), safety control units etc.

To install such a safety system, cables have to be connected from the control cabinet to the sensor, to the reset push button box, to the time reset push button box and to the emergency stop push button box and to the machines and processes.

Normally a safety system e.g. used within production additionally needs further safety functions such as additional supervised gates, supervised openings for detecting material for allowed transport into and out of the hazardous space, safety devices for setting up the production process and troubleshooting.

The control cabinet with the safety units or modules needs drawings, wires, marking of wires, DIN (Deutsches Institut für Normung)-rails for safety modules, terminals for cables, cable glands, and requires manual mounting and inspection in order to ensure safety that is provided and upheld according to regulations and standards. The control cabinet is costly and complicated to make and to make installations and connections is time consuming and complicated, and for a production line it is often unique and often involves machines from different manufacturers.

EP 1 496 411 shows a safety controller adapted to be mounted on a DIN rail in a control cabinet as discussed above.

When it is possible, companies are standardising on some safety functions in order to reduce the costs for the documentation and the inspection. This means, however, that changing from a standard solution is costly and complicated.

The requirements for the safety functions are described in safety standards globally and locally. In Europe the requirements are written in the Machinery Directive and in the EN standards for safety. The global standards for safety are in many cases in line with the EN standards. Large numbers of safety devices and safety modules have to be certified according to the safety standards before they can be used in Europe and also in other countries around the world.

If there is to be a combination of safety devices inside a control cabinet, a verification thereof is required as well. The costs for all the paperwork and inspection can be very high.

Thus, to summarize, there are several drawbacks associated with today used safety systems and safety units, such as the requirement as to specialized or customized control cabinets, high cost and time consuming documentation, planning and paperwork, certification and inspections. Other significant drawbacks consist in the large number of cables that are needed, and, in addition, the large number of wires inside the cables, which is very disadvantageous for installation and replacement purposes, the connection of each wire also needing to be verified, for practical reasons, and not least for reasons of trouble shooting. Still further, installation is complicated and time consuming, maintenance costs are high, and maintenance as such is complicated.

In addition, it is, among other things for the reasons given above, very complicated and time consuming to perform modifications, adaptations and alterations in/to such a known safety system, which means that, in practice, known systems have a limited flexibility.

SUMMARY

It is therefore an object of the present invention to provide a programmable safety unit as initially referred to through which one or more of the above-mentioned problems can be overcome.

It is particularly an object to provide a programmable safety unit which is easy to install, use and operate.

It is further a particular object to provide a programmable safety unit which is easy to maintain and which enables easy and straightforward modifications and improvements of safety functions.

It is also an object to provide a programmable safety unit through which paper work, documentation and inspection can be facilitated and reduced and that the costs associated therewith can be reduced.

It is also an object to provide a programmable safety unit which enables and facilitates installation, modification and upgrading in a fast and reliable manner and which allows for fulfilment of high and reliable safety functions.

It is a particular object to provide a programmable safety unit through which the number of cables, and/or the number of wires in each cable can be reduced while providing any required safety functions.

A most particular object is to provide a programmable safety unit which allows for a high flexibility as far as safety installations are concerned, which facilitates inspection and reduces the need of manual inspections.

Still further it is an object to provide a safety module through which the requirements as to customization for each particular hazardous environment are reduced as compared to for known safety units.

Therefore a programmable safety unit as initially referred to is provided which has the characterizing features of claim 1.

Still further it is an object to provide a safety system as initially referred to through which one or more of the above mentioned problems can be solved.

Therefore a safety system as initially referred to is provided which has the characterizing features of claim 13.

Further yet it is an object to provide a method in a safety system through which one or more of the above mentioned problems can be solved.

Therefore a method in a programmable safety system as initially referred is provided which has the characterizing features of claim 19.

Advantageous embodiments are given by the respective appended dependent claims.

BRIEF DESCRIPTION OF THE DRAWINGS

The invention will in the following be further described in a non-limiting manner, and with reference to the accompanying drawings, in which:

FIG. 4A is a schematic block diagram of a wireless safety unit.

DETAILED DESCRIPTION

Figure 1:
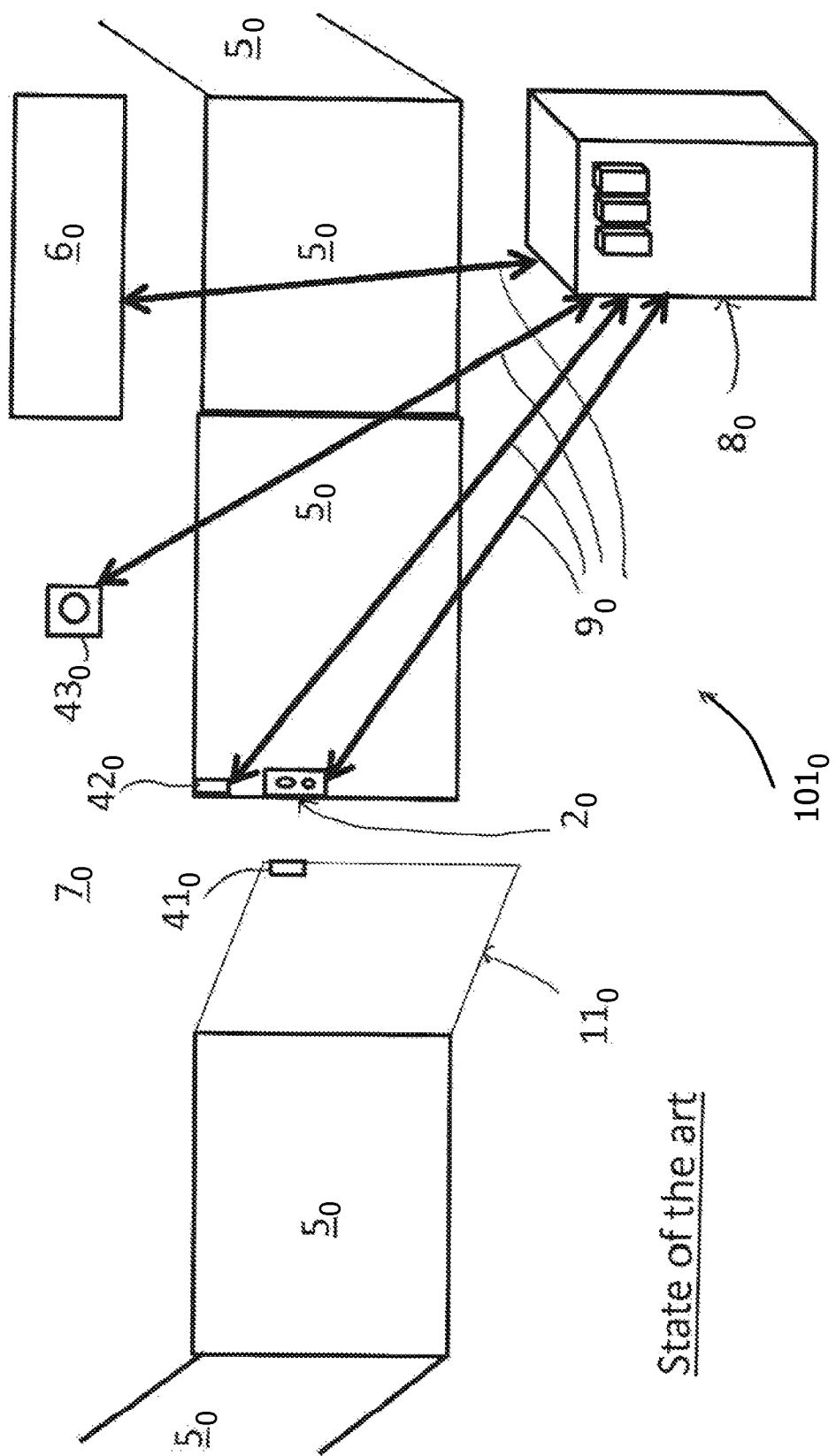
FIG. 1 schematically illustrates a safety system according to the state of the art, FIG. 2 schematically illustrates a safety unit according to a first embodiment of the present invention, FIG. 3 schematically illustrates a safety unit according to a second embodiment of the present invention, FIG. 4 schematically illustrates a safety unit, which is wireless, according to a third embodiment of the invention.

FIG. 1 is a schematic block diagram showing a safety system $1010$ according to the state of the art. FIG. 1 illustrates hazardous machines and/or processes $6_0$, a hazardous space $7_0$, enclosures $5_0$, an interlocked gate $11_0$ and safety sensors $41_0$, $42_0$ for detecting the opening state of a gate, i.e. if it is opened or closed. It also discloses a push button box 20 with emergency stop and reset and a time reset $42_0$. As discussed in the background section, a control cabinet $8_0$ is provided which comprises a number of safety modules and terminals. As can be seen in FIG. 1, all units, safety sensors, time reset, hazardous machines, push button box etc. are connected to the control cabinet $8_0$ via cables $9_0$.

Figure 2:
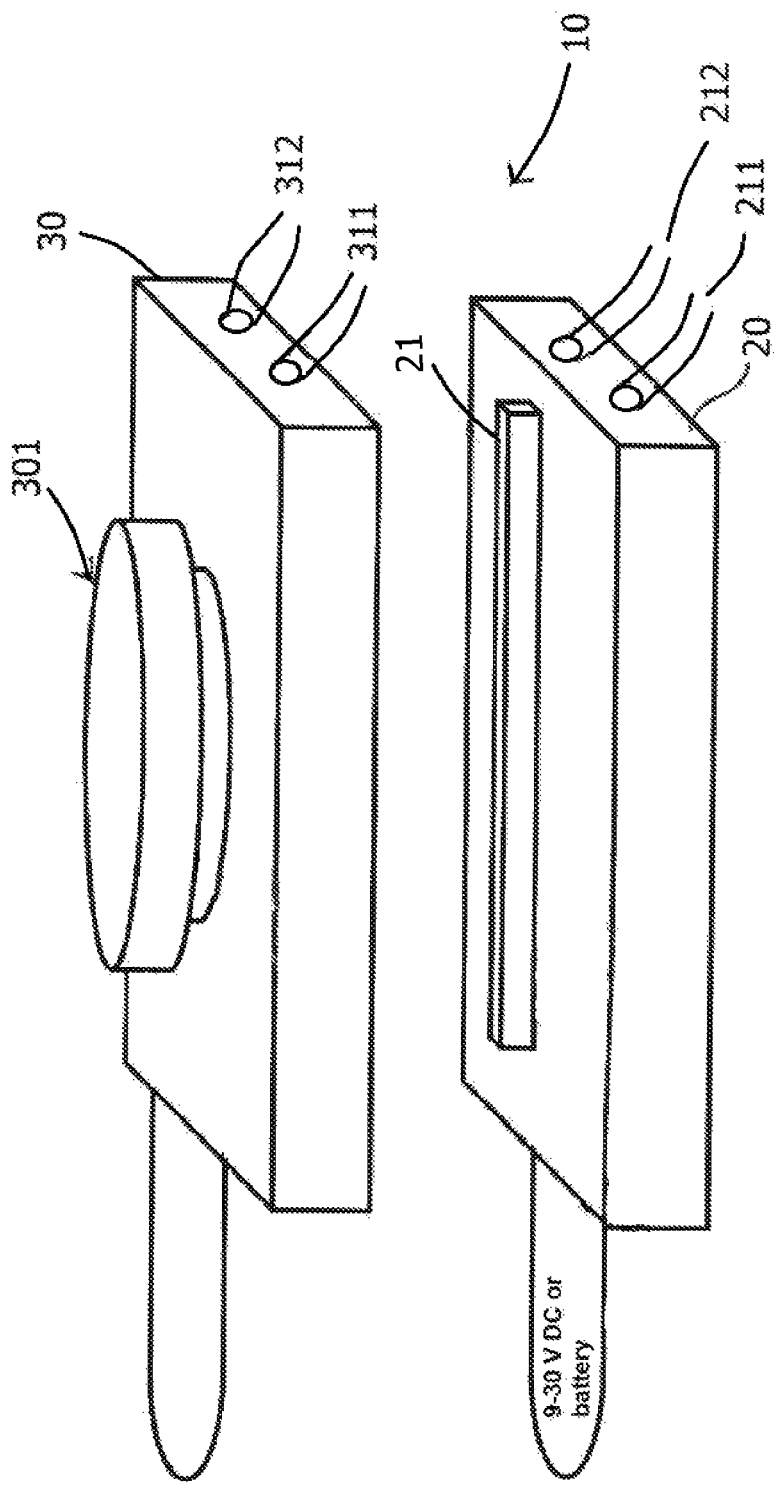

FIG. 2 shows a safety unit 10, also called a safety function control module or a safety box 10, comprising a connection part 30 and a safety module part 20. In the shown embodiment the safety module part 20 and the connection part 30 are electrically interconnected by means of a terminal 21 providing all connections. It should be clear that alternatively wires can be used instead of a terminal, cf e.g. FIG. 3. The safety module part 20 comprises a programmable module and here also comprises e.g. two connections 211, 212. The connection part 30 preferably comprises a number of further connection possibilities 311,312 e.g. for safety devices, other safety units and machines and/or processes (not shown in FIG. 2). The connection part 30 (and/or the safety module part 20) further may comprise a number of push buttons 301.

The safety module part 20 and the connection part 30 mounted together form a safety unit 10 fulfilling safety standards for safety functions. The circuitry is preferably designed according to safety standards such as for example EN (European standard) ISO 13849-1 Performance level d, category 3 and MTTF high or low. This means in this case two redundant safety circuits with two processors. The inputs and outputs are designed to detect failures in connections such as short circuits and wrong connections. Some or all I/O: s (inputs/outputs) can be selected as safety inputs or safety outputs and they are controlled by both processors. Some outputs have relay contacts. The power supply is normally 9-30V DC voltage, or a battery, here power is supplied to the safety module 20; in other embodiments the power supply may be provided at the connection part, see e.g. FIG. 3. In advantageous embodiments one and the same safety unit can be used with 12V DC as well as with 24V DC.

Figure 13A:
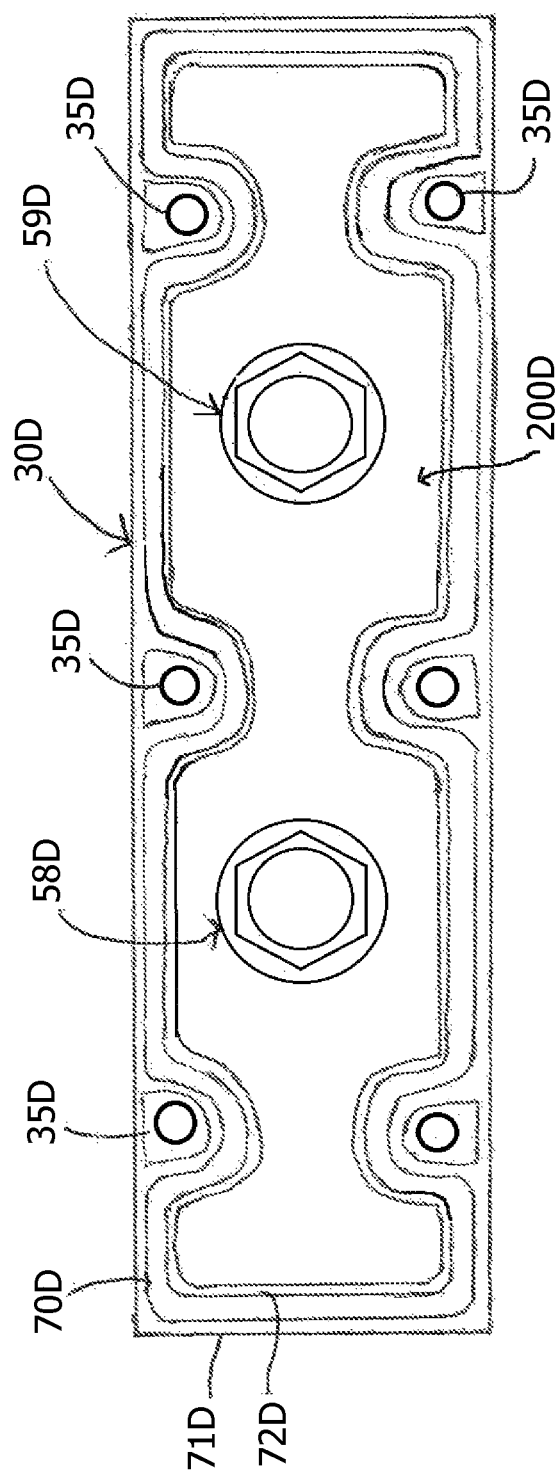
Figure 13B:
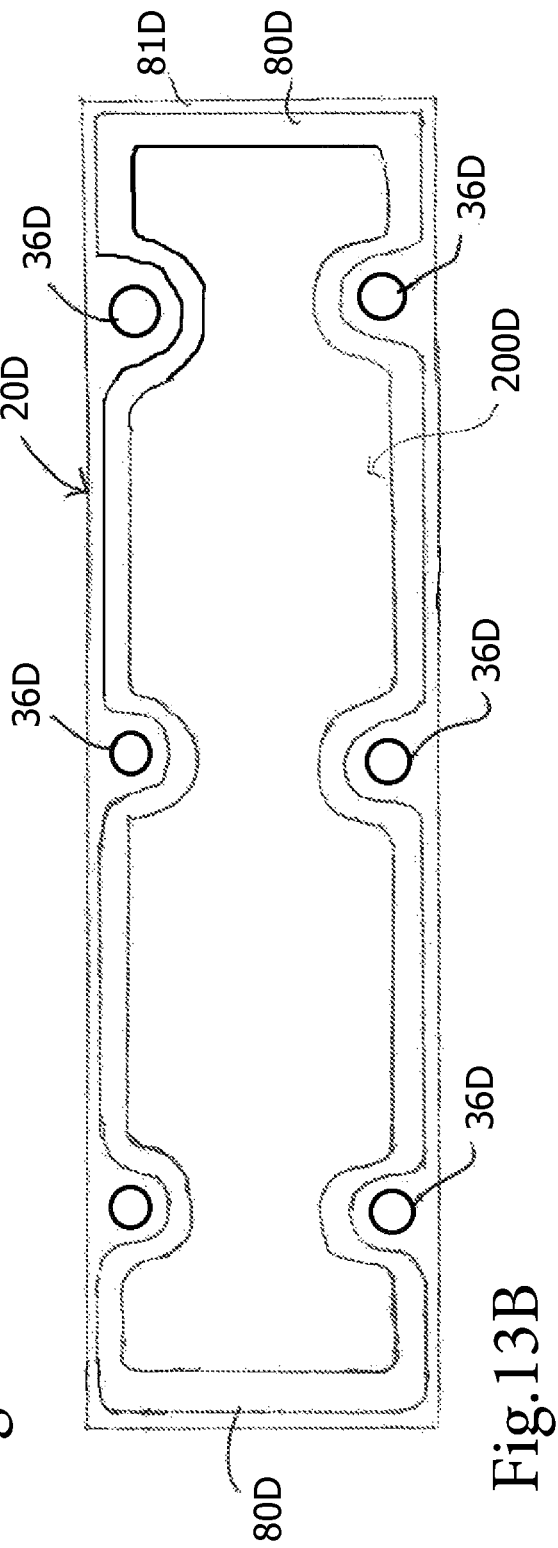

The safety module part and the connecting part are mechanically interconnected or mounted together e.g. by means of an interconnecting arrangement comprising flanges or by means of an interconnecting arrangement comprising a sealing element and a protruding element or rim outside which interconnecting screws are provided (see e.g. FIGS. 13A,13B,14A,14B) to form an encapsulated safety unit 10 fulfilling or exceeding the enclosure demands for the installation concerning protection against dust and water. Normally IP (International Protection rating) 54 is required in the industry but also higher demands such as IP 67 to 69 could be demanded. FIGS. 13A,13B as referred to above show an interconnecting arrangement comprising a sealing arrangement allowing the interconnection of the safety module part and the connection part of the safety function control module (safety unit) allowing fulfillment of the relevant enclosure demands. In alternative embodiments flanges can be used instead, or additionally, to ensure fulfillment of applicable enclosure demands. Many different embodiments are possible.

Since the interconnection of the module part and the connection part and all connections and bushings are adapted to fulfil applicable enclosure demands, the safety unit 10 can be used for external mounting. All signals are handled in the safety unit and all electrical connections are provided in the safety unit.

Further, according to the invention, the complete safety function for a gate is included in the safety unit 10. A sensor for a gate and a time reset push button is connected with cables to the safety unit 10. A reset and emergency stop push button 301 is mounted directly on the connection part 30 of the safety unit 10 as referred to above. The machine(s) and/or the process(es) are connected directly to the safety unit 10. This limits all the extra cabling required in state of the art systems for any control cabinet, which hence is not needed. All signal handling is made in the safety unit 10 which reduces the number of wires in the cables. According to the invention, the safety function is certified beforehand for the application and no extra description is needed. Further, according to the invention, the paperwork for the documentation of the safety function is done beforehand and can be used for a machinery documentation. The user only has to verify that he either has connected all the wires to the right terminals or placed the right connectors to the right connection plugs. A safety unit, i.e. a safety function control module, 10 according to the present invention can be used on any safety system on the market which has safety stop inputs for a machine, a production line or a process. The safety unit 10 is not dependent on special safety devices or brands of safety devices.

If for example more stop outputs are needed than those available on a safety unit 10, a further safety unit 10 just needs to be added with output expansion functions. Alternatively, or additionally, if more inputs with the same function are to be connected, an input expansion safety unit just needs to be added by means of interconnecting means arranged such that required enclosure demands are met. The safety unit 10 (the safety module 20) is programmable by the supplier, which means that the number of safety functions is in principle unlimited. The software program(s) is/are installed either via a computer or through a memory card inside the safety module 20.

Figure 3:
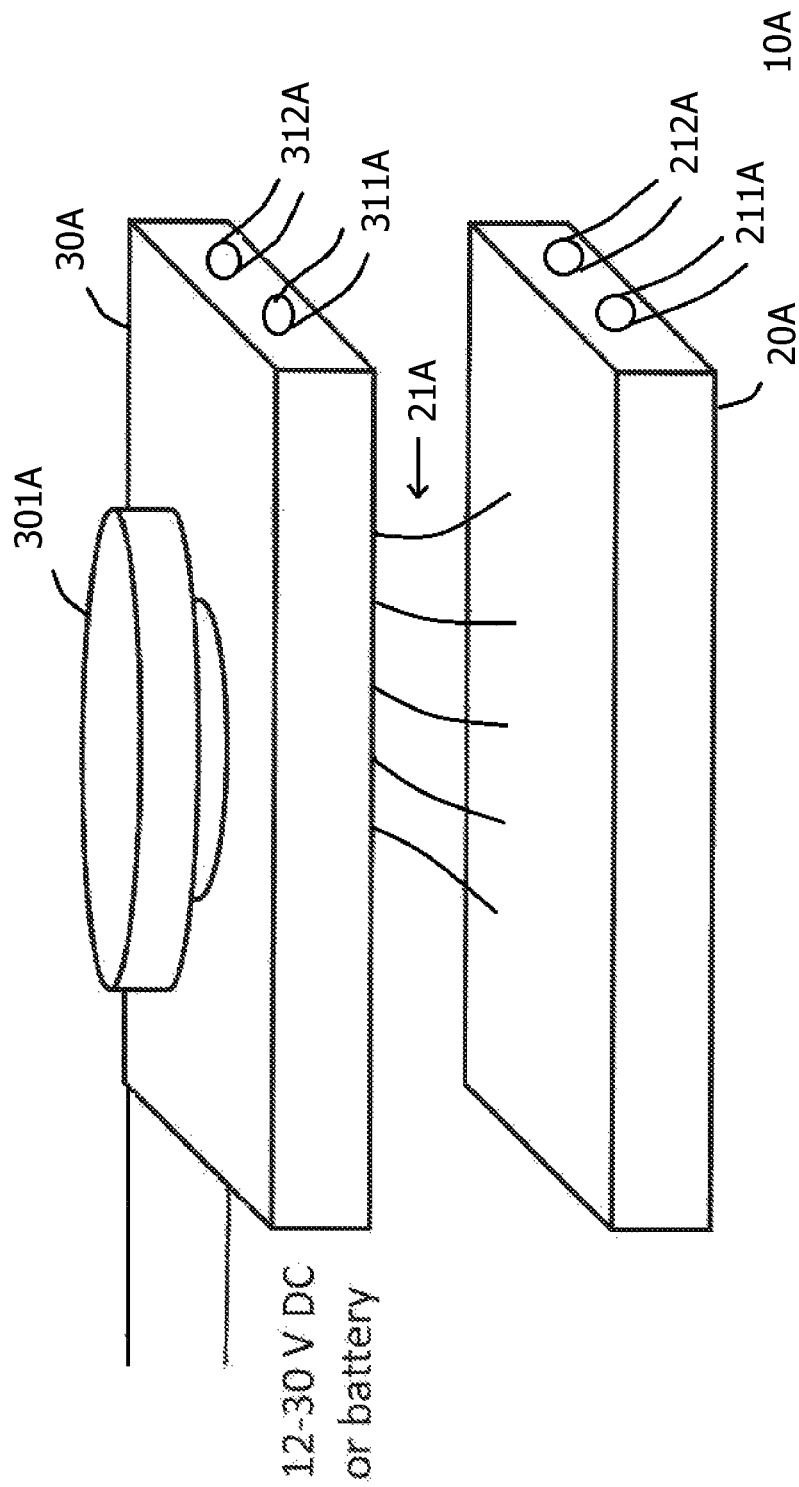

FIG. 3 shows an alternative embodiment of a safety unit 10A.

The safety unit 10A is similar to the safety unit 10 of FIG. 2 except for the voltage supply by means of a 9-30V DC voltage supply or a battery being connected to the safety module 20A, and there being no terminal for the connections between the safety module part 20A and the connection part 30A, but instead a number of wires 21A. It should be clear that there could alternatively have been a terminal, or that the power supply could have been provided to the connection part; there is no dependence between the features of power supply and whether this is provided to the connection part or the safety module part, and the provisioning of a terminal or wire connections. The safety unit 10A will not be further described, since the other features and the function have already been discussed with reference to FIG. 2, and like elements bear the same reference numerals but provided with an index "A".

Through a safety unit as described with reference to FIGS. 2,3 the control cabinet of state of the art devices is rendered superfluous. In addition, paper work, documentation and inspection costs are reduced. Also, which is extremely advantageous, performing modifications and improvements of a safety system in which safety units according to the invention are used, is considerably facilitated and costs therefore considerably reduced.

Through such a safety unit also the number of cables, as well as the number of wires in a cable, can be reduced to a large extent, which is extremely advantageous from, among other things, an installation point of view, a maintenance point of view, for trouble shooting, and also saves a lot of costs.

A particular advantage consists in the possibility of certification of the safety units comprising complete safety functions, i.e. certification can be done on beforehand, upon manufacture.

Further, since the safety units are made in external boxes for direct connection of safety devices, push buttons, machines and processes costs and labour can be saved. Also, since the external safety units comprise connectors for standard cables it is only needed to verify that the cables are connected between the right connectors instead of verifying every separate wire in a cable. This also reduces the maintenance costs as the safety units are easy to exchange.

FIG. 4 shows an embodiment of a safety unit 10B. Similar elements bear the same reference numerals as in FIGS. 2,3 but indexed "B" and they will not be further discussed herein. The same variations are also possible for the safety unit 10B. The safety unit 10B supports wireless communication WL.

In the area of safety within industry or similar there has for a long time been a need for safe wireless control in order to be able to realize safety solutions for equipment, machines, processes etc., and also for mobile equipment, in order to facilitate and at least to some extent remove the need for complicated and costly cable drawing and to avoid production stops and disturbances due to cable wear. It is known to use bus systems for communication via a wireless link, but they are sensitive to disturbances and the reaction times are often too long. Some known systems use available standardized systems such as Bluetooth, but also then the reaction time is often too long among other things due to the multitude of applications to be handled by Bluetooth.

Wireless control and communication systems implemented in known systems used within the crane industry often comprise a transmitting unit and a receiving unit. As far as safety is concerned, a reaction time of 500 ms is accepted for an emergency stop. Within e.g. manufacturing or production industry, where the safety distances often are much shorter, the normally required reaction times are 100 ms, in some instances reaction times as short as below 20 ms are required.

For safety systems within production industry they often have to be set up and involve several machines and/or processes, and a plurality of safety arrangements need to communicate in both directions. If one machine is stopped by a safety device or system, it is very likely that also other machines or processes need to be stopped as well, and different safety measures need to be communicated in both directions. This may become very complex and therefore programmable safety systems are often used. As also referred to above, such programmable systems involve high requirements on the programmer and on the system, and on testing and verification. Often the systems have to be checked by certified instances in order for the production system being approved for taking into operation.

Through safety units according to the inventive concept, as also discussed above with reference to non-wireless safety units, certified safety functions can be provided without requiring a new certification of an entire system.

The wireless safety unit 10B implements a communication protocol adapted for safety control and communication, and comprises short messages with a frequency which is as high as needed in order to allow the required number of messages to be delivered.

In a simple embodiment there are but two units communicating with each other, and which in combination can replace a cable. The communication may be one-directional or two-directional.

For a production system with a plurality of machines and/or processes and several safety arrangements, several safety units communicating with one another, in both directions, are needed. Each one of the safety units also need to be programmed for performing internal functions, i.e. monitor safety arrangements connected to the stop functions of the machine itself. In order to avoid disturbances when wireless communication and control is implemented, a protocol is needed, as also referred to above, according to which transmission takes place in a short time since it has to be considered that several transmissions may be lost. The basic idea is that a plurality of accepted packets are needed in order to assure a safe control. Therefore each safety unit 10B (only one shown in FIG. 4; cf. FIGS. 9-11 for safety systems) transmits I/O status on all safety units comprised in a system, cf e.g. FIG. 7. This means that the status of each unit is repeated by the other units. The transmitted information also comprises information about the time of the transmission. The time of the transmission is then also used for determining if the transmission time falls within a predetermined maximum time interval of e.g. 100 ms, which in turn indicates a minimum number of accepted status information messages of a unit. If the time period between accepted status information messages exceeds the predetermined maximum time interval, the I/O from a unit is set to "0". The units using I/O with value "0" will set the output/outputs using this value to zero, "0". Thereby the basic preconditions for safety circuits, meaning that loss of energy shall induce a safe position, are met.

The safety unit 10B comprises at least two cable connections which may be programmed to act as a safe input and/or output, and supports wireless communication with at least one other unit. Preferably the frequency 2.4 GHz is used for the wireless communication. It should however be clear that the inventive concept is not limited to this specific frequency, but alternatively also other, lower as well as higher, frequencies can be used. Each unit is given an identification number, and in some embodiments, also a node number; see e.g. FIG. 11 below.

The maximum communication time interval referred to above preferably can be set to different values, and can be changed and set to different values e.g. between 20 ms and 500 ms and also higher or lower. In advantageous embodiments the setting of the reaction time is done via software.

Preferably a message sent between any two units is repeated by one or more other units, providing a reliable communication.

Preferably a safety unit is capable of transmitting several times in 20 ms.

In preferred embodiments the safety units are freely programmable.

As also referred to above, each transmitted message comprises a time indication that can be measured or detected, which provides information about when it was transmitted, in order to enable determining if a transmitted message is received within a predetermined allowable time interval. Two safety units are able to replace a cable between a safety sensor and a machine control or similar.

Each safety unit 10B (also applicable for the non-wireless safety units discussed above as well as several or all other features with the exception of the wireless protocol and features associated with wireless communication) may contain a replaceable memory card comprising programs, id-number, and optionally also node number, which can be moved to another safety unit if a safety unit e.g. needs to be replaced. A memory card for a system comprising one or more safety units can be mounted without requiring the user or the operator to perform any programming, i.e. this is done automatically as soon as the memory card has been mounted or manually by just pressing a button and power is supplied to the safety unit.

Preferably the encapsulation of each safety unit meets at least the requirements concerning protection against particles or dust and water ingress of e.g. IP 54, in advantageous embodiments e.g. up to IP 69.

In advantageous embodiments two or more safety units, wireless or not, can be interconnected such that the encapsulation class requirements are met, see e.g. FIGS. 5,6 below. This particularly means that cables/wires can be connected between the safety units without requiring specific sealing.

FIG. 4A is a schematic block diagram showing a basic design of communication of a wireless safety unit 10B (not indicated) provided with an indication display 303 with a number of LEDs for indication purposes. The safety inputs normally comprise double inputs, reset inputs and supervision inputs for contacts. The safety outputs normally comprise double outputs, relays etc. Non-safe I/O refer to non-safe inputs/outputs e.g. for information and other non-hazardous functions. The WL protocol is a wireless protocol used for communication with other safety units and/or information units or modules and/or for safety communication.

It should be clear that the features also are applicable in case of a non-wireless safety unit, in which case hard-wired communication is implemented instead of wireless communication.

Figure 5A:
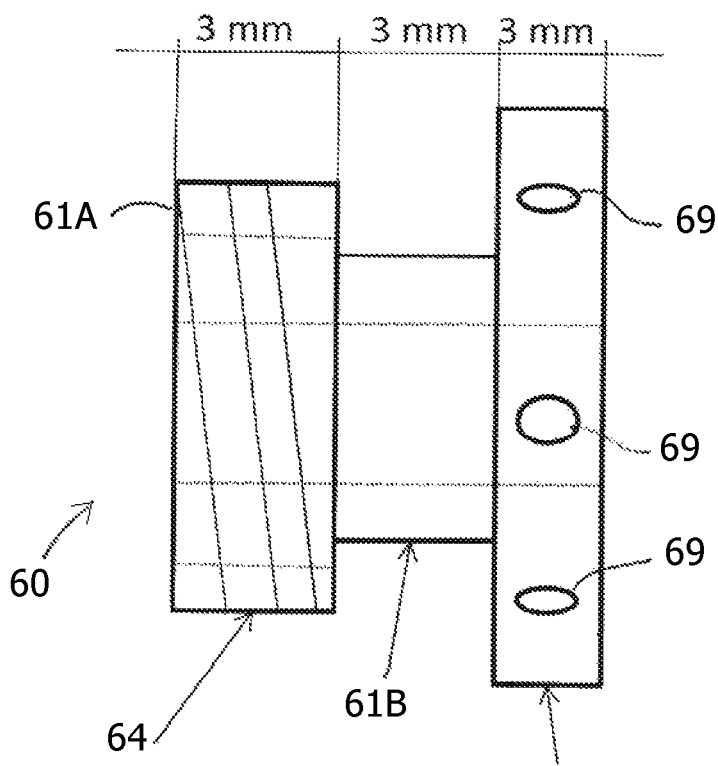
FIG. 5A is a schematic illustration of a safety unit interconnection means comprising a screw.

FIG. 5A shows a mounting arrangement 60 according to one embodiment for interconnection of two safety units. It comprises a first portion 61A with, here, e.g. an M6 threading, and which here has a diameter of approximately 16 mm, a second section 61B with a diameter of 12 mm and a third section 61C diameter of 20 mm, which forms an outer edge and preferably is provided with openings for a pin or similar for allowing tightening of the screw.

Figure 5B:
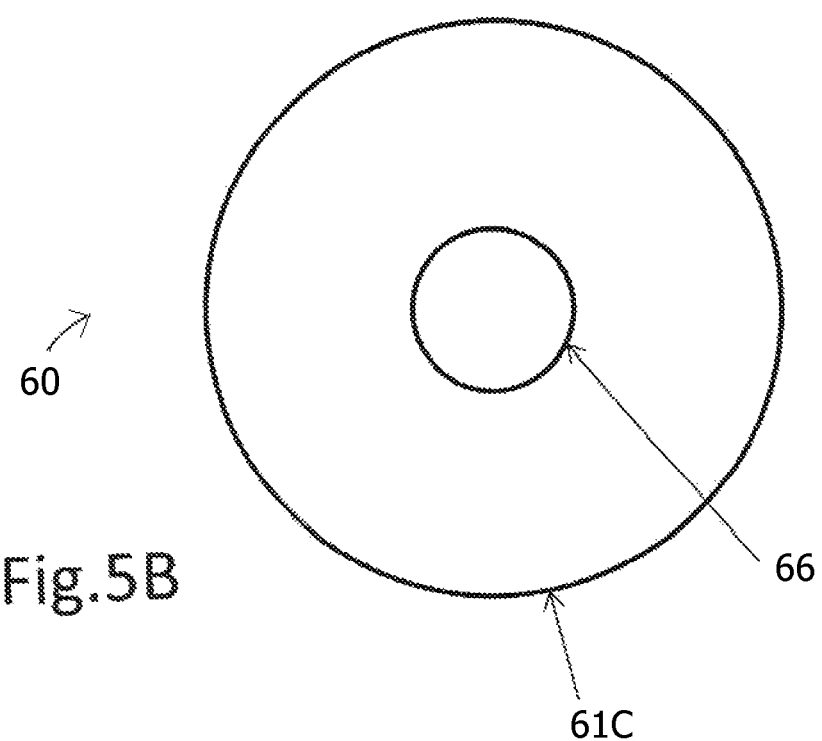
FIG. 5B is a view from above of the screw in FIG. 5A.

FIG. 5B shows the head of the screw 60 with the third section 61C forming the outer edge. It is provided with an internal through hole or opening 66 for allowing the passage of cables between interconnected safety units.

Figure 5C:
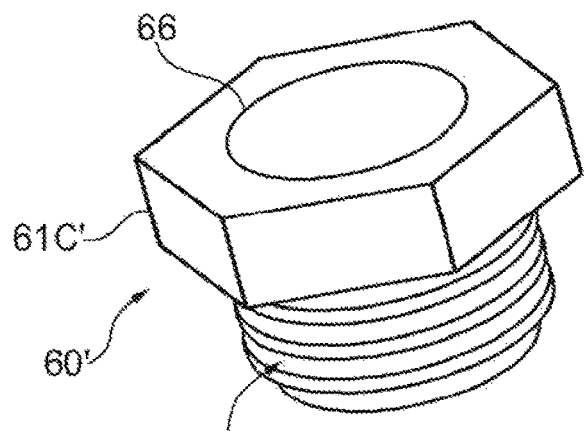
FIG. 5C is another schematic illustration of a safety unit interconnection means comprising a screw.

FIG. 5C is a schematic view of a screw 60' e.g. as in FIGS. 5A,5B showing the threading 64; preferably there are no threads close to the head or third section 61C', which here is illustrated as having a hexagonal shape for facilitating fastening/removal by means of e.g. a torque wrench. Of course also the third portion or head of the screw 60 of FIGS. 5A,5B may have such a shape, or any other appropriate shape for securing/removal purposes. Other elements bear the same reference numerals as in FIGS. 5A,5B and will therefore not be further discussed. Preferably there are no threads close to the head. The screw is mounted into the short side of one safety unit and secured through the adjacent, joining short wall of the other safety unit to which it is to be mounted. The screw can be accessed through an upper open side of the safety module where it is to be connected to the connection part. Of course the interconnection of safety units may be achieved in a similar manner through instead mounting two connection parts to each other by means of a screw 60,60'. It is also possible to instead, or additionally, provide for mounting safety units to one another along the long sides of the safety units, by correspondingly mounting the connection parts and/or safety modules using mounting screws as discussed above.

Figure 5D:
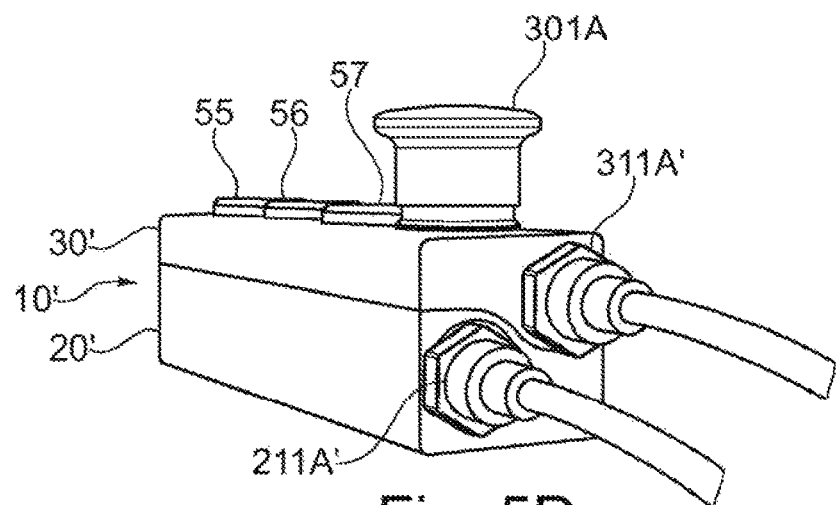
FIG. 5D illustrates an embodiment of a safety unit with connection cables and optionally connectable to another safety unit.

FIG. 5D shows a safety unit 10' comprising a safety module part 20' and a connection part 30' with connection cables 211A' and 311A' respectively provided diagonally or offset in order to provide more space for the connection cables. The safety unit 10' comprises an emergency push button 301A and start, stop and reset buttons 55,56,57.

Figure 5E:
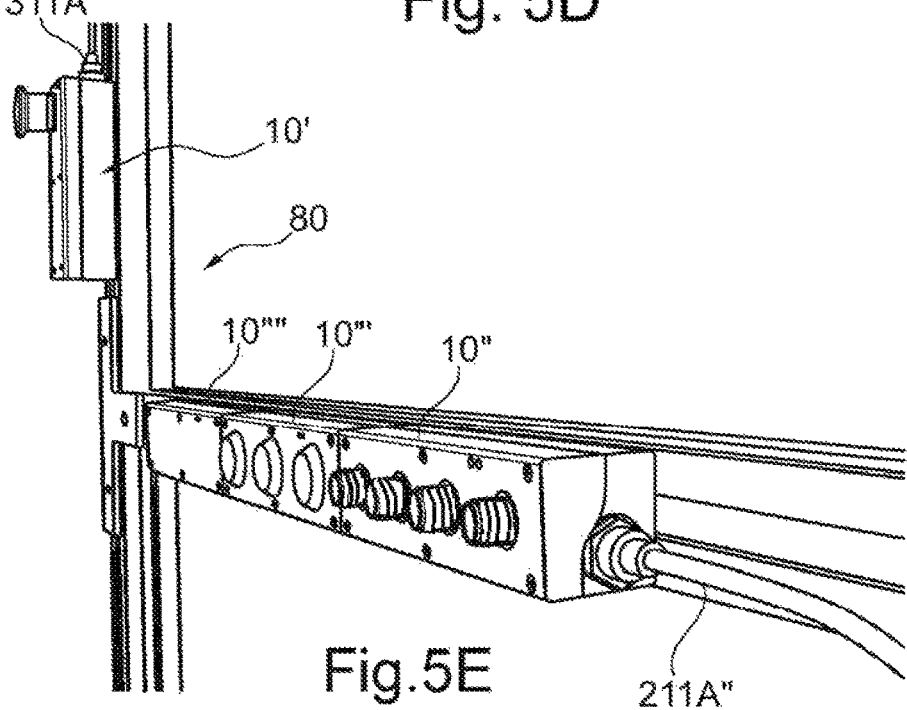
FIG. 5E is a view in perspective of an embodiment with four safety units with connection cables mounted on a fencing.

FIG. 5E shows a safety unit 10' as in FIG. 5D and three further safety units 10'',10''',10'''' mounted on a fencing 80 comprising, here, a 40 mm Al-profile.

Figure 5F:
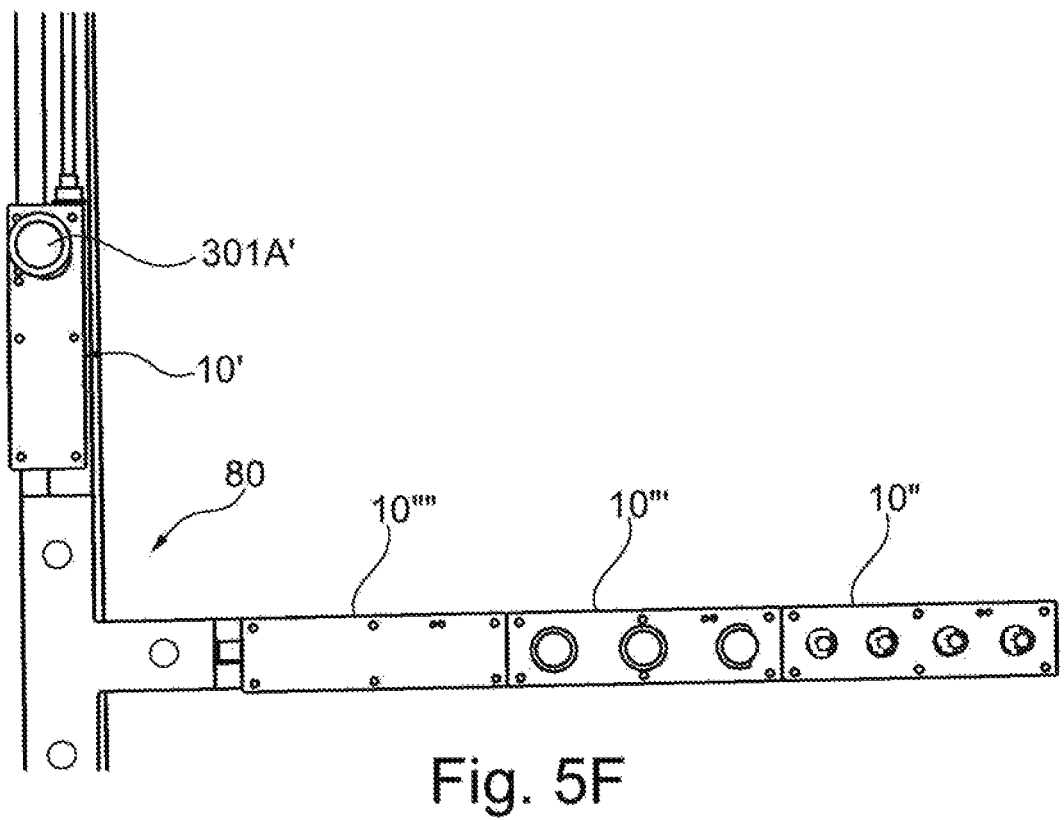
FIG. 5F is a front view of the embodiment shown in FIG. 5E with four safety units with connection cables mounted on a fencing.

FIG. 5F is a front view of the safety units 10', 10'',10''', 10'''' as in FIG. 5E mounted on a fencing 80 comprising, here, a 40 mm Al-profile. Here safety unit 10'' is provided with four connections, e.g. with M12 threadings, for protection or safety devices or machines etc.

Figure 5G:
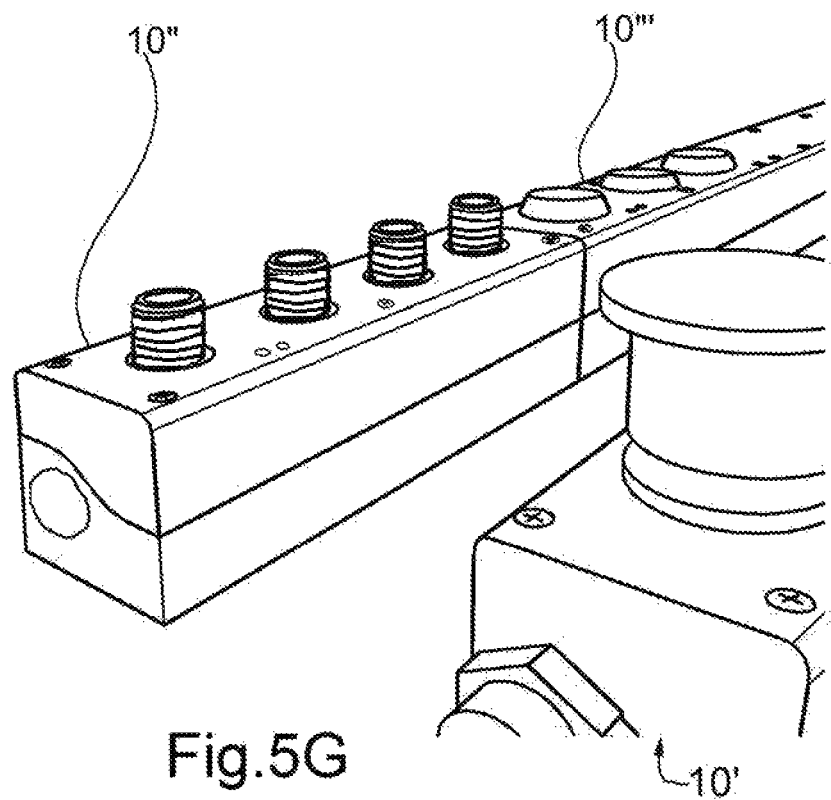
FIG. 5G is a view in perspective showing a number of safety units as in FIG. 5E.

FIG. 5G shows three exemplary safety units 10',10'',10''' substantially as in FIGS. 5D-5F in an unmounted state.

Figure 6A:
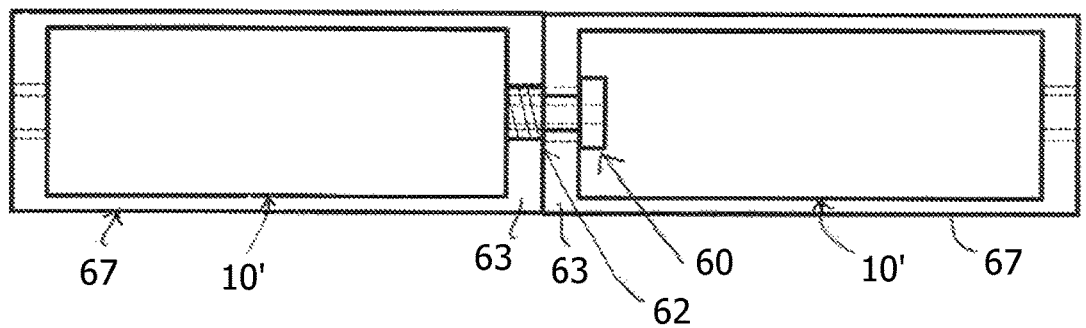
FIG. 6A is a simplified view in cross-section of two interconnected safety units according to one embodiment of the invention.

FIG. 6A very schematically illustrates two interconnected safety units 10',10'. The safety units may be of any appropriate kind, e.g. corresponding to the safety units described more in detail with reference to FIGS. 2-3, or of any other appropriate kind.

They are here interconnected by means of an interconnecting arrangement 60, e.g. comprising screws of a plastic material, as described with reference to FIGS. 5,5A above.

The safety units are here further interconnected by means of a screw 60 connecting the safety units through openings provided in oppositely arranged side walls 63,63 here having a wall thickness of about 3 mm. The screw 60 and the wall openings here are provided with an M16 threading 64. Reference numeral 62 is intended to indicate space allowing arranging of a seal between the encapsulations 67,67 of the safety units 10',10'.

Figure 6B:
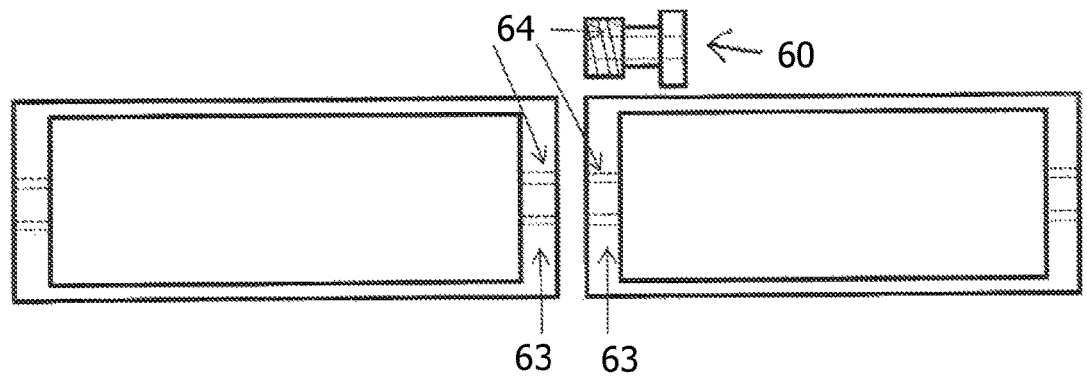
FIG. 6B is a view similar to that of FIG. 6A before mounting.

FIG. 6B shows the safety units in an unmounted state for illustrative purposes.

Figure 6C:
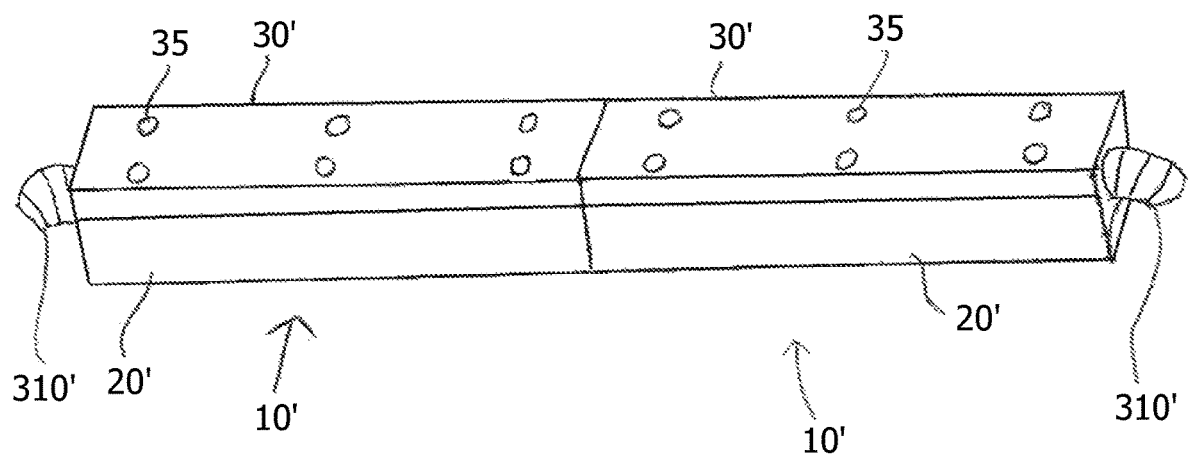
FIG. 6C is a simplified view in perspective of the two interconnected safety units of FIG. 6A.

FIG. 6C is a view in perspective of the interconnected safety units 10',10' of FIG. 6A. In FIG. 6C the connection parts 30',30' are connected to the safety module parts 20',20' by means of screws 35 or in any appropriate manner. For reasons of simplicity no push buttons etc. are shown in FIGS. 6A-6C, the mere purpose of these Figures being to illustrate how two (or more) safety units can be interconnected by means of the interconnecting arrangement 60. In this case the bottom parts (or safety module parts) 20' are connected to each other. Therefore the short sides (or short side walls) of adjacent parts to be mounted together are made to form 90° with each other (and with the longitudinal sides of the respective part). Such parts (with short sides forming 90° with the long side walls, bottom wall, and upper wall) can be made using jaws which are movable in order to enable removing the part from a plastic forming tool during manufacture.

The housing in advantageous embodiments has a width of 40 mm since standard fencings often have 40 mm profiles as posts.

Also the cables 310',310'' are only shown very schematically, reference is in this context made to FIGS. 2-4, and the description relating to tight encapsulation above. Also, the power supply is not explicitly illustrated, reference being made to FIGS. 2-4 and the corresponding sections in the description.

Figure 7:
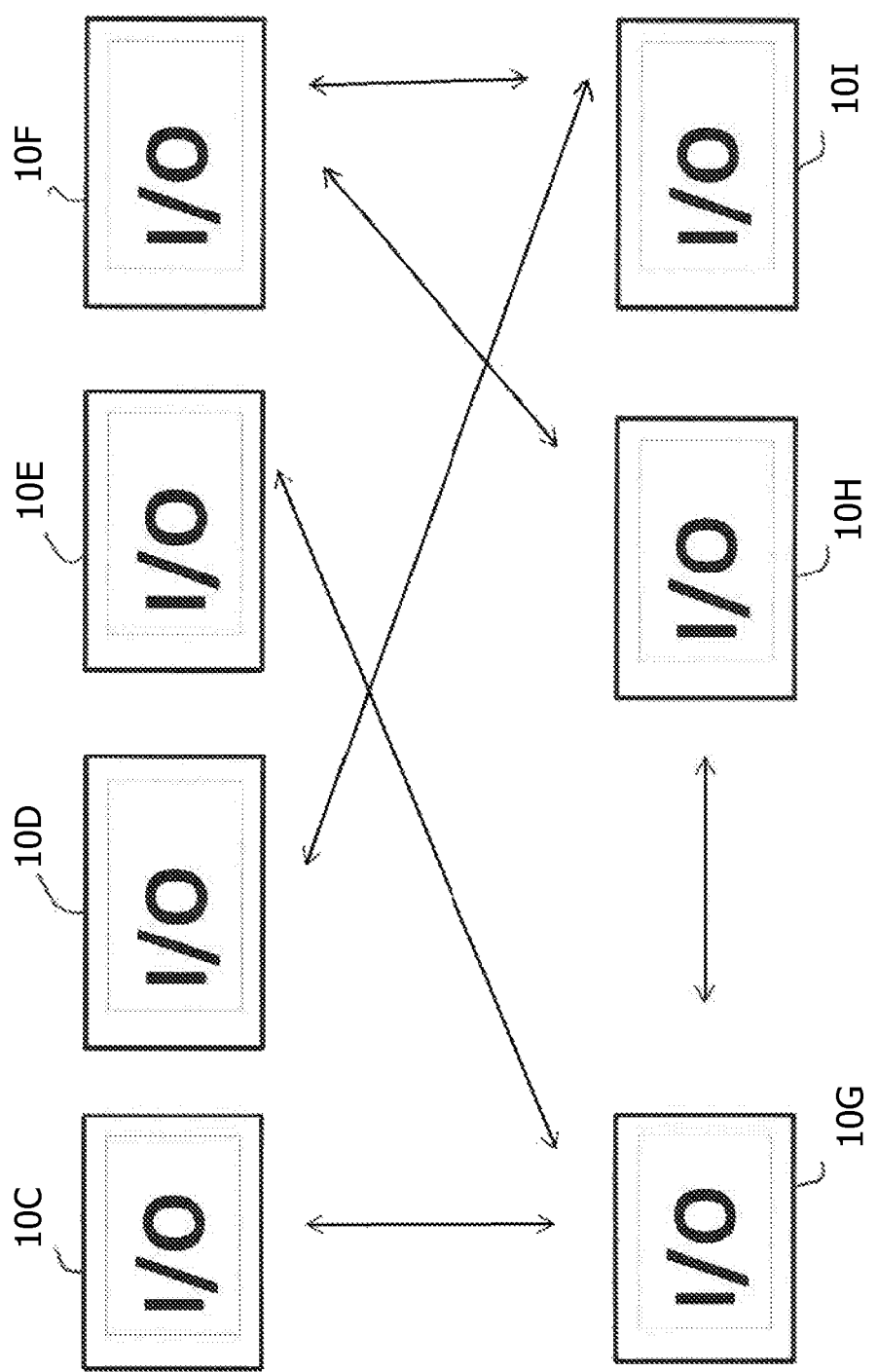
FIG. 7 is a very schematic block diagram of a number of communicating programmable safety units.

FIG. 7 is a very schematic illustration of communication between a plurality of safety units 10A, 10B, . . . , 10I as also discussed more thoroughly above. In some embodiments all safety units are in communication with all the other safety units, directly or indirectly. In some embodiments not all safety units communicate directly, but indirectly via one or more other safety units. As an example, if ten safety units are mounted at a respective distance from each other, each safety unit e.g. only receives messages from up to two other safety units, each at a distance from the other, i.e. safety unit 1 only receives messages from, or listens to, safety unit 2, safety unit receives messages from safety unit 2, and safety unit 3 receives from safety units 4 and 2 etc. This means that safety unit 10 receives information directly from safety unit 1 via safety unit 9, which has received it from safety unit 8, which in turn has received it from safety unit 7 etc. This in turn means that the status information of safety unit 1 will be at least 9 transmissions "old", but this is acceptable as long as it is received within the set reaction time.

One (or more) of the safety units may e.g. in addition communicate via Wi-Fi allowing remote monitoring via a portable communication device or a fixed remote device, e.g. a computer, a Laptop, an I-pad, a mobile telephone etc.

Figure 8:
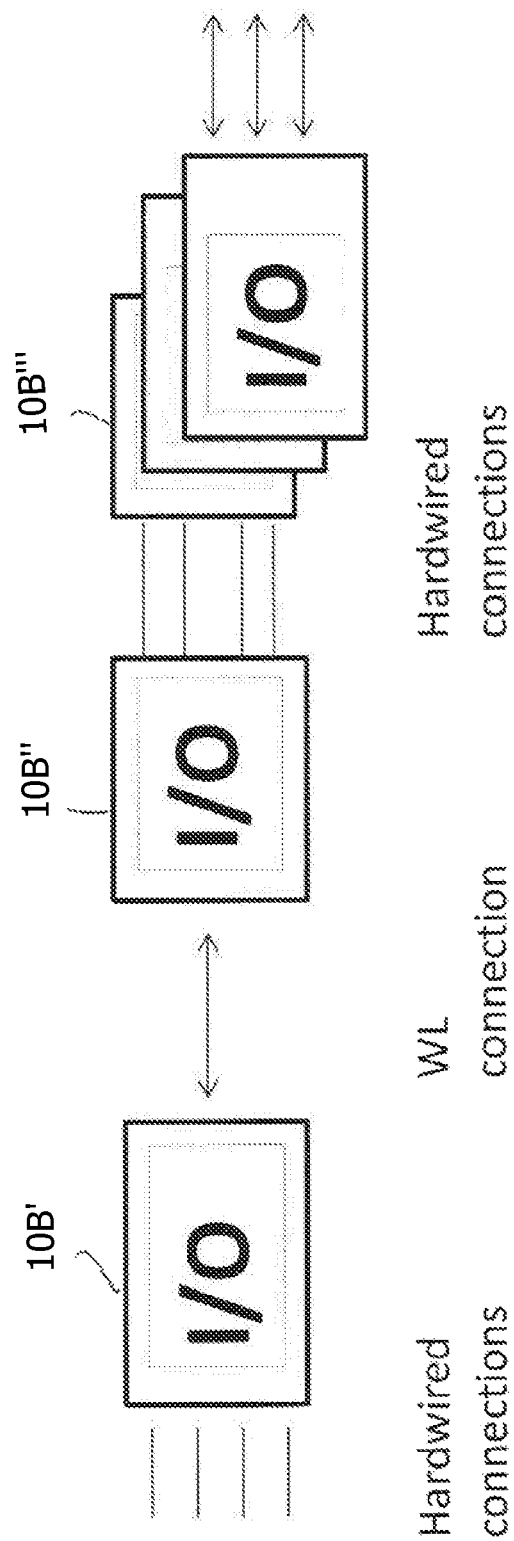
FIG. 8 is a very schematic block diagram of a number of programmable safety units which are communicating wirelessly and having hardwired connections to machines, emergency stops etc., FIG. 9 schematically illustrates a safety system according to one embodiment of the invention, FIG. 10 schematically illustrates a safety system according to another embodiment of the invention, FIG. 11 schematically illustrates a safety system according to still another embodiment of the invention, FIG. 12 schematically illustrates a safety system according to an embodiment of the invention wherein a safety unit further is connected via Wi-Fi to a portable wireless device, FIG. 13A schematically illustrates a connection part of a safety function control module, a safety unit, from the inside according to one embodiment of the invention, FIG. 13B schematically illustrates a safety module part of a safety function control module, a safety unit, from the inside for interconnection with the connection part of FIG. 13A.

FIG. 8 also is a schematic illustration of a plurality of safety units 10B',10B'',10B''' . . . , wherein wireless communication is implemented between safety units 10B' and 10B", and wherein hard-wired communication is implemented between safety units 10B" and 10B' . . . . Hardwired connections are also implemented for connections to machines, emergency stops, push-buttons, enabling devices and other safety devices in this embodiment.

Figure 9:
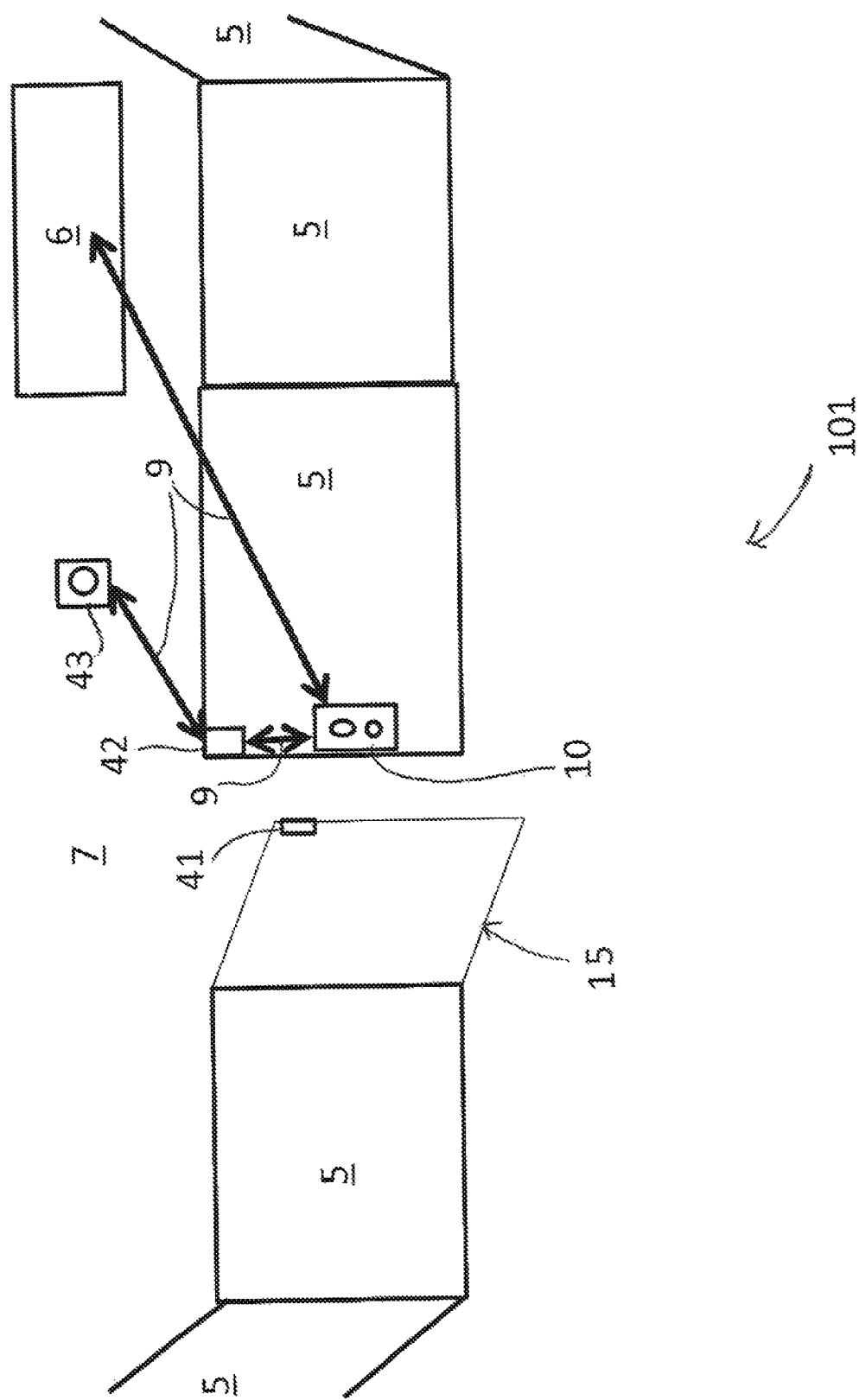

FIG. 9 schematically illustrates a safety system 101 installed for ensuring safe conditions of hazardous machines and processes 6, within an hazardous space 7, and in a very simplified manner also illustrates enclosures 5 and an interlocked gate 15. At, or adjacent, an enclosure 5 a safety unit 10 is provided which comprises connections and push buttons for emergency stop and reset; see e.g. the safety units 10,10A in FIGS. 2,3. A safety sensor arrangement 41,42 is provided for detecting the opening state of the gate 11. The safety unit 10 is in communication with the safety sensor arrangement 42 by means of a hardwired connection. It also is in communication by means of a hardwired connection with a time reset 43, and by means of further hardwired connections with the hazardous machines and processes 6.

The safety unit 10 is supplied with power as discussed e.g. with reference to FIG. 2 (not shown in FIG. 9), for example optionally any of 12 or 24V DC, and comprises a voltage converter or transformer for transforming down the voltage respective voltage to the lower voltage of the components, e.g. about 5V or lower.

It is extremely advantageous that 12V as well as 24V can be used.

As also discussed more in detail below, with a safety unit 10, a safety system 101 as disclosed herein, any control cabinet can be dispensed with, and is rendered superfluous.

In particular, advantageous, embodiments, wireless communication is provided between safety units, wherein each safety unit is assigned a unique number in a system of safety units. All safety units are receiving and transmitting I/O data from the other safety units in the system. The information may e.g. comprise information used in a safety unit to connect LEDs which provide status information such as an emergency stop button on a particular safety unit is pressed or a particular gate is opened etc.

The information may be transformed into information in a computer connected to a safety unit. The information may also be transformed to other wireless systems as for example Wi-Fi and be read in a unit connected to Wi-Fi, allowing remote monitoring and control, which is extremely advantageous.

The information may also be transformed to a PLC-system through an I/O module or a gateway connected to a safety unit.

Thus the information about the status of, or in, the safety system is communicated wirelessly.

Figure 10:
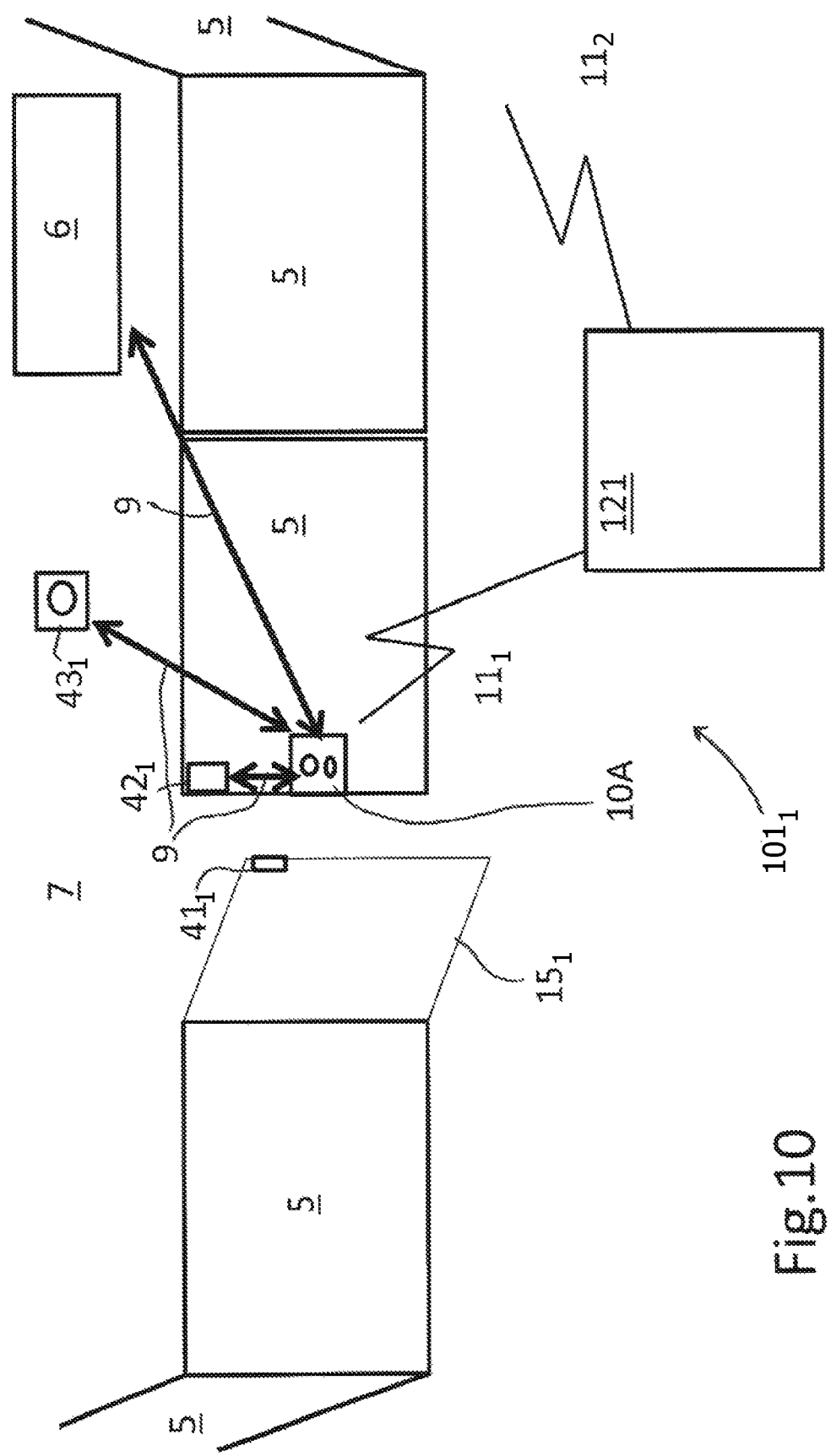

FIG. 10 schematically illustrates an alternative embodiment of a safety system $101_1$ installed for ensuring safe conditions of hazardous machines and processes 6 within an hazardous space 7, and in a very simplified manner also illustrates enclosures 5 and an interlocked gate $15_1$. At, or adjacent, an enclosure 5, a safety unit 10A is provided which comprises connections and push buttons for emergency stop and reset; see e.g. the safety unit 10A. A safety sensor arrangement $41_1,42_1$ is provided for detecting the opening state of the gate $11_1$. The safety unit 10A is in communication with the safety sensor arrangement $42_1$ by means of a hardwired connection. It also is in communication by means of a hardwired connection with a time reset $43_1$, and by means of further hardwired connections with the hazardous machines and processes 6. In this embodiment the safety unit 10A supports wireless communication over a wireless communication network $11_1$ as discussed earlier in the application with an information panel 121 e.g. comprising a number of LEDs indicating for example pressed emergency stops, opened gates etc. In FIG. 10, the information panel 121 also is in wireless communication $11_2$ with another safety unit (not shown).

The safety unit 10A is supplied with power as discussed e.g. with reference to FIG. 2,3 or 4 (not shown in FIG. 10), for example 12 or 24V DC.

Figure 11:
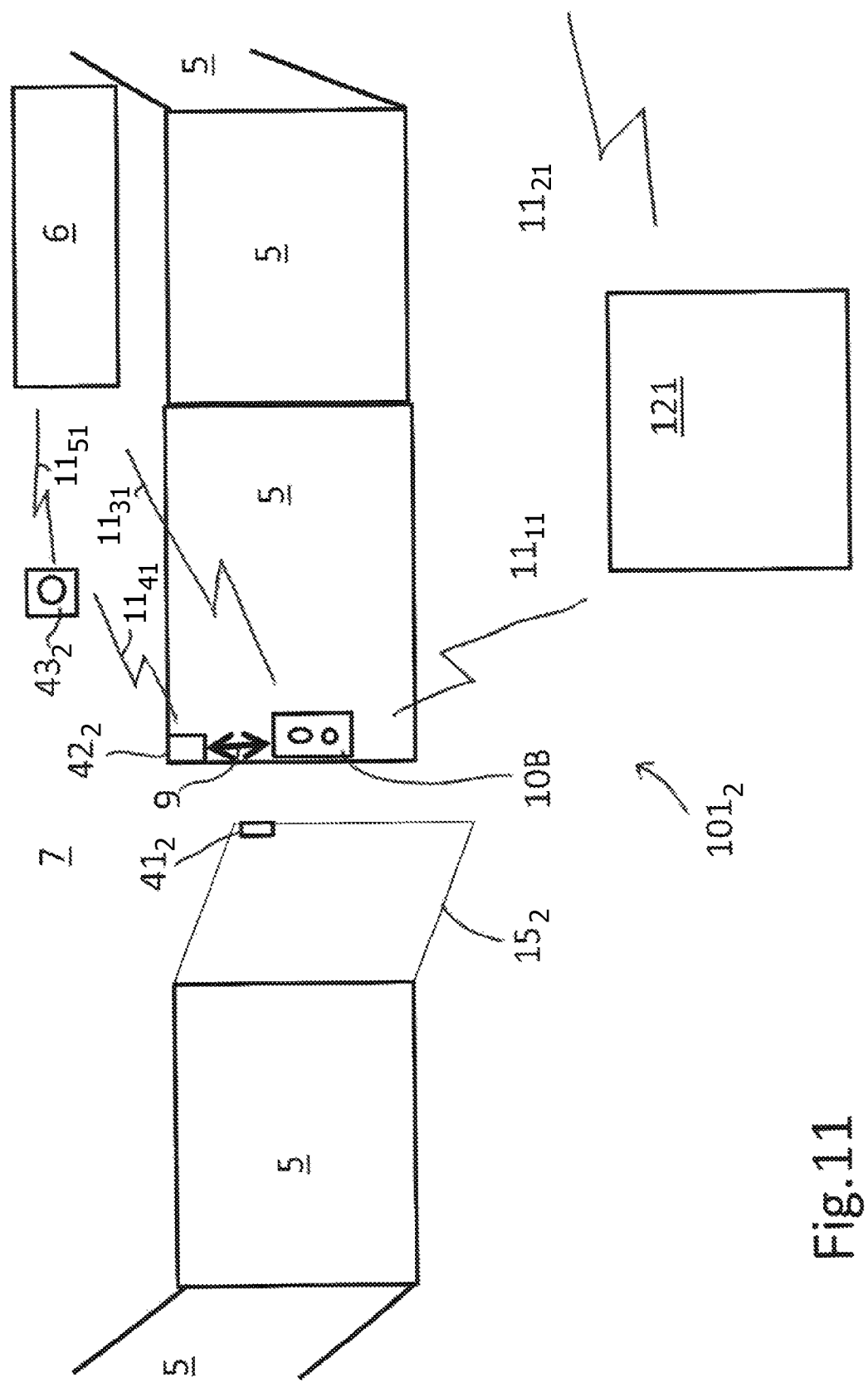

FIG. 11 schematically illustrates an alternative embodiment of a safety system $101_2$ installed for ensuring safe conditions of hazardous machines and processes 6 within a hazardous space 7, and in a very simplified manner also illustrates enclosures 5 and an interlocked gate $15_2$. At, or adjacent, an enclosure 5, a safety unit 10B is provided which comprises connections and push buttons for emergency stop and reset; see e.g. the safety unit 10B in FIG. 4 (or safety units 10,10A of FIGS. 2,3). A safety sensor arrangement $41_2,42_2$ is provided for detecting the opening state of the gate $11_2$. The safety unit 10B is in communication with the safety sensor arrangement $42_2$ by means of a hardwired connection. In this embodiment the safety unit 10B supports wireless communication $11_{41}$ with a time reset $43_2$, here also forming a safety unit, and also with the hazardous machines and processes 6, here also comprising or forming a safety unit, the communication $11_{41}$ is wireless. In this embodiment the safety units 10B, $43_2$,6,121 also support wireless communication over a wireless communication network 1111, as also discussed with reference to FIG. 10, with an information panel 121 e.g. comprising a number of LEDs indicating for example pressed emergency stops, opened gates etc. In FIG. 11, the information panel 121 itself forms a safety unit and also is in wireless communication 1121 with another safety unit (not shown). The information panel may also, or alternatively, comprise a Wi-Fi unit, safety unit 10B hence also supporting communication via Wi-Fi, in addition to the wireless communication with the other safety units via the proprietary protocol.

The safety unit 10B is supplied with power as discussed e.g. with reference to FIG. 2,3 or 4 (not shown in FIG. 11), for example 12 or 24V DC.

In advantageous embodiments safe wireless communication is provided between several safety units. Each safety unit will be assigned a unique number and a node id. In this case different systems can be provided. Two safety units can be used in exchange for a cable. The safety units can exchange safety data in both directions. This is particularly advantageous when cable installation is difficult or very expensive. For mobile machines the installation of safety devices and provisioning of reliable safety conditions is extremely facilitated. When several safety units are connected to each other wirelessly it is easy to stop movable machines when an emergency stop push button is pressed or when a gate is opened to an area with mobile machines. This does not only make it easier, it additionally enables for introduction of new safety arrangements and for new machine applications.

In order to reduce the costs for the wireless communication standard frequencies for wireless communication are preferably used. This however increases the risk for disturbances in the communication. Therefore the protocol is made for short time communication and for fast detection of relevant data packages as also discussed earlier in the present document. It is also made possible to have two communication frequencies at each safety unit. The channels for communication can be either automatically or manually selected depending on the environment. In order to be able to use the wireless communication for safety applications requiring short reaction times, the communication package for each safety unit is made short in order to be able to reach a short reaction time, preferably down to 20 ms. For some applications the reaction time can be much longer, e.g. up to for example several seconds for machines when it takes several seconds to reach the machine after a gate has been opened.

The number of safety units exchanging the I/O status between each other will be limited depending on the required reaction time and on the environment. More than one system with safety units can however be used in the same environment. For the communication between them, the same or different channels can be used depending on the logic selected for the communication and the required reaction time.

For a safety system loss and return of power supply shall not cause hazardous conditions. Neither shall loss of wireless communication cause hazardous conditions. If power supply is lost to e.g. the described gate safety function, the machines and processes will be stopped. A restart would require making sure that no one is inside the fence by making the reset procedure.

If wireless communication is lost for a time period exceeding the maximum allowed reaction time (for example 400 ms) between a safety unit installed at a gate and a safety unit installed in a machine, this will lead to a stop of the machine. The same reset procedure would be required at the gate in this case as for loss of power supply.

If the safety unit e.g. is used for a safety function with a light barrier, the maximum allowed reaction time would be shorter, for example 20 ms in many cases. A light barrier can be passed much quicker than a gate and therefore the requirements on the wireless communication would be much higher. Lost communication for more than 20 ms between safety units exchanging safety signals would lead to a stop of e.g. the machine. In environments where wireless communication is not reliable for short reaction times, this can be solved e.g. by using a direct connection between the safety unit, light barrier and the machine. The safety function for this would not depend on the wireless communication as this is done within one safety unit and the safety unit itself would handle a stop within 20 ms if the light barrier is passed by someone. If the safety unit also has an emergency stop connected to other safety units through the wireless network, the maximum reaction time for loss of communication could be set up to 500 ms.

Hence, in such embodiments, also the safety communication between safety units, between safety units and machines and processes is wireless.

A plurality of further different safety functions can be provided and facilitated by means of a safety unit, or a safety system, according to the present invention, of which a few examples comprise providing a connection box for a portable two-hand device with or without cable, a connection box for a portable enabling device with or without cable, a connection box for a portable two hand-device with or without cable, providing bypass connection systems for light barriers and light beams for the handling of material into and out of hazardous spaces, providing safety sectors for loading and unloading of machines with or without wire, providing connection boxes for inputs, start, stop, emergency stop and supervision of internal contactors in a machine or process.

Figure 12:
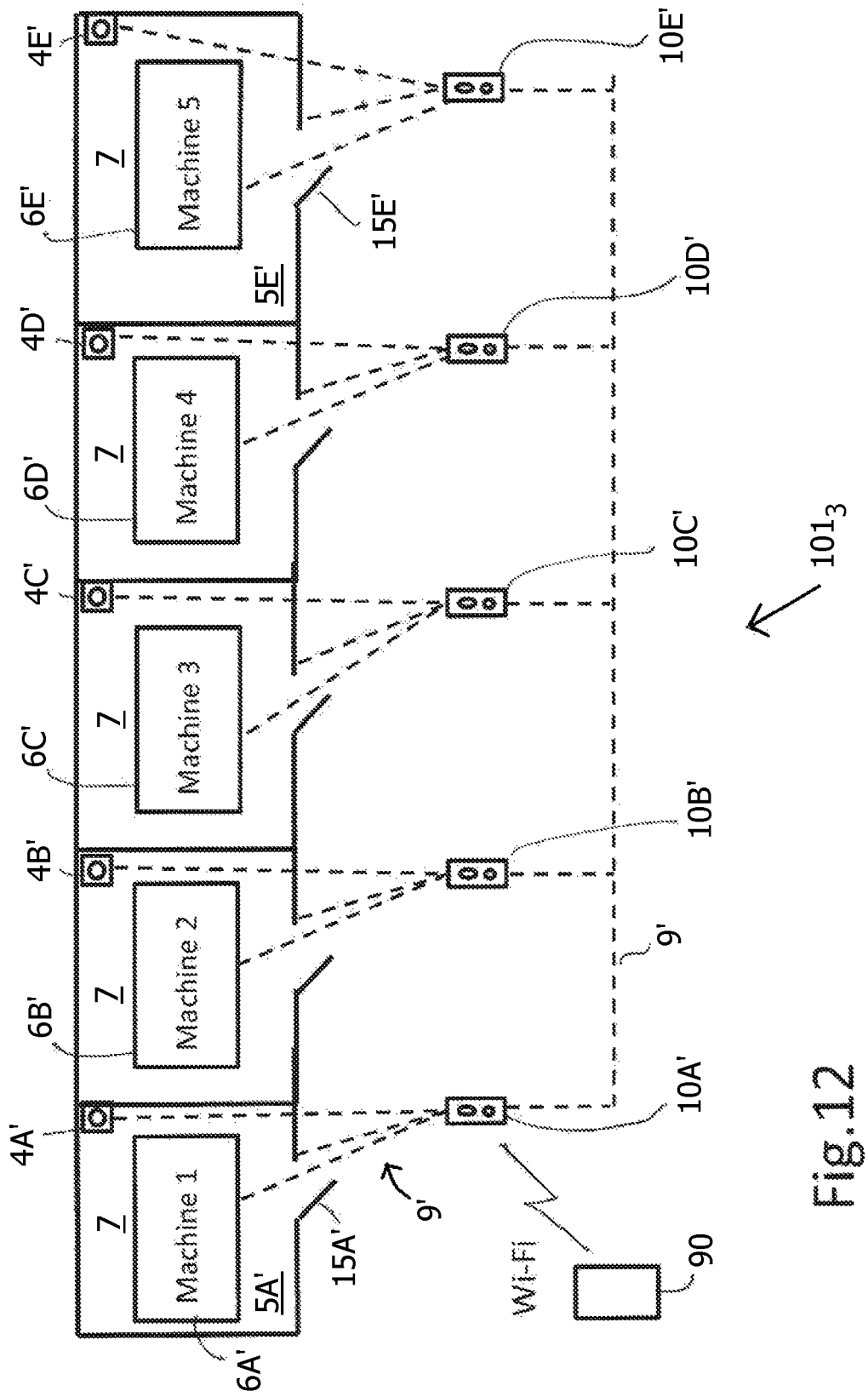

FIG. 12 shows an exemplary safety system $101_3$ comprising a number of safety units 10A',10B',10C',10D',10E' for safety control of five hazardous machines 6A',6B',6C',6D', 6E' enclosed by means of enclosures 5A', ..., 5E' enclosing respective hazardous zones 7 provided with gates 15A', ..., 15E', the state (opened/closed) being detected by means of safety sensors (not explicitly illustrated in FIG. 12) as more thoroughly discussed with reference to FIGS. 9-11. It is here supposed that the safety units, the safety sensors, the machines and the time resets 4A', ..., 4E' are interconnected by means of wires. In alternative implementations the interconnection can be provided entirely by means of a wireless network as discussed above e.g. with reference to FIG. 11. In the shown embodiment safety unit 10A' additionally supports a Wi-Fi-connection, e.g. allowing remote monitoring and control e.g. via a mobile device such as an I-pad, a mobile phone, a Laptop etc. Since all the safety units are interconnected, wirelessly or via cables, information is provided concerning all current safety conditions for the whole system, which is extremely advantageous.

With reference to FIG. 13A and FIG. 13B a connection part 30D and a module part 20D respectively of a safety unit 10D which is substantially similar to the safety units shown in FIGS. 5D,5G are shown. FIGS. 13A and 13B show one advantageous way of interconnecting or mounting the connection part 30D and the module part 20D using an interconnecting arrangement such that enclosure demands are fulfilled as discussed above. FIG. 13A shows the inner side of a connection part 30D, here an upper part. Along the outer edges a groove is provided between an exterior wall section or an outer edge 71D and an interior wall section 72D. The groove, along each longer side section, here at three different locations, is arranged to form a bend of a substantially semi-circular or U-shape, or any other appropriate shape, or bulge inwards towards the opposite long-side, in order to leave space between the groove and the outer edge or rim of the connection part 30D at such locations for a screw hole 35D. A sealing member 70D e.g. comprising rubber, e.g. Gore-Tex™, is introduced into the groove, hence being arranged along the outer edges of the connection part 30D, except for where screws are to be received from the upper side of the connection part 30D for interconnection with the module part 20D. For illustrative or exemplifying purposes connections 58D,59D are very schematically indicated. In alternative embodiments there may also be left space outside the sealing member for holes allowing mounting to a wall or similar by means of screws.

FIG. 13B is an inner view of the module part 20D, which is provided with a protruding rim or lip of the same shape and corresponding location with respect to the external edges 81D of the module part 20D as the groove (or seal) with respect to the external edges of the connection part 30D, leaving space for, here, six threaded screw holes 36D for reception of mounting screws introduced into the screw holes 35D of the connection part 30D. Thus, when the connection part 30D and the module part 20D are mounted by means of mounting screws screwed into holes 35D located outside the sealing member 70D and received in the threaded screw holes 36D in the module part 20D, the rim 80D will be pressed against the sealing member 70D, ensuring a tight enclosure. 200D schematically indicates the space for PCB and components.

Figure 14A:
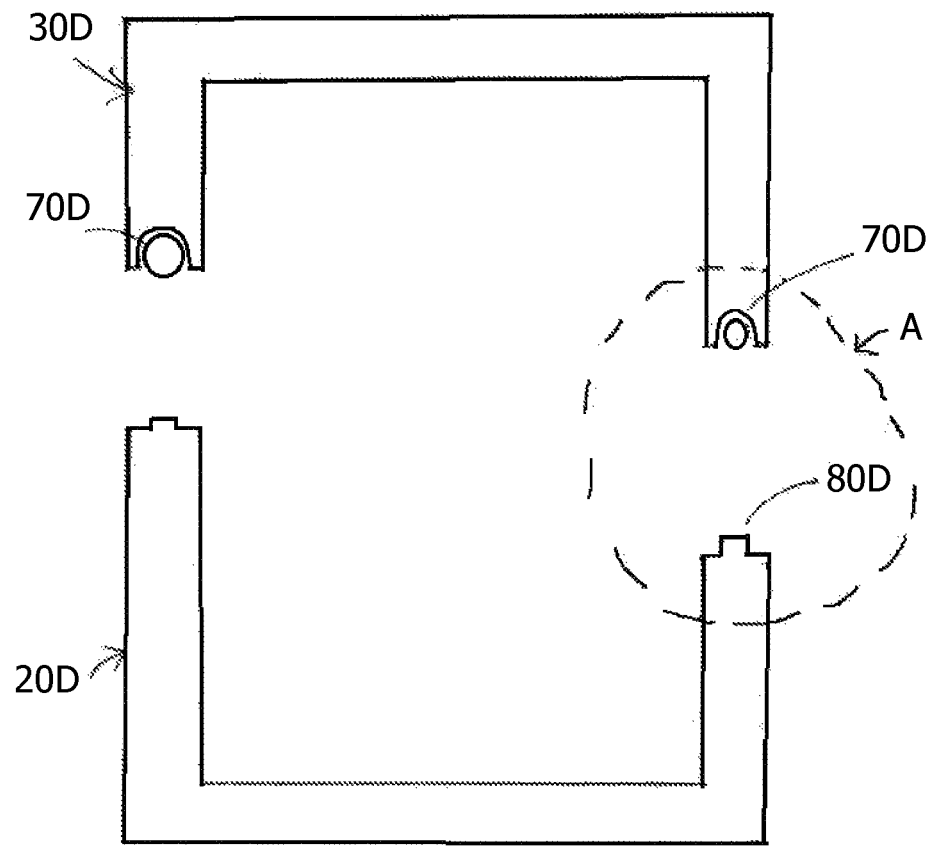
FIG. 14A is a schematic view in cross-section illustrating the interconnected safety function module parts of FIGS. 13A,13B.
Figure 14B:
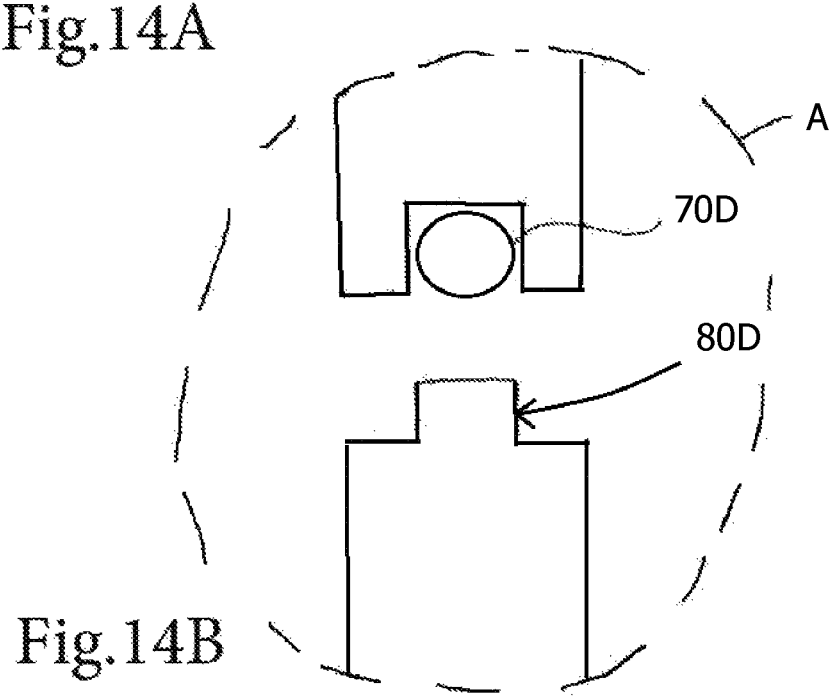
FIG. 14B shows more in detail section A as indicated in FIG. 14A.

FIG. 14A is a very schematic cross-sectional view in an enlarged scale taken though a safety unit comprising a connection part 30D and a module part 20D as in FIGS. 13A and 13B in a position for interconnection (an example of a safety unit is e.g. shown in FIG. 5G). It can be seen how the sealing member 70D located in a groove will be forced against protruding edge 80D, shown in an even larger scale in FIG. 14B showing section A as indicated in FIG. 14A.

According to the invention a safety unit is hence mechanically encapsulated, and, as also discussed earlier, several units are interconnectable such that relevant encapsulation requirements are fulfilled, allowing different expansion possibilities, and a modular system is provided, e.g. adapted for external mounting on a fencing or a profile, and the functions previously handled by a control cabinet have been moved to, and can be handled by the safety unit. All connections are handled within the safety unit, and all bushings are sealed.

The invention is of course not limited to units or systems fulfilling the above mentioned standards or requirements, but is equally applicable to other standards, in addition or solely, or to only some of these standards depending on the specific environment and specific needs.

It should also be clear that the invention is not limited to the shown embodiments but that it can be freely varied within the scope of the appended claims.

It should further be clear that also in other aspects the invention can be varied in many different ways. It is particularly not limited to any given dimensions or numbers discussed for any of the constituent elements or parts or functions. They can be smaller as well as larger. It is also not limited to any particular number of safety units in a system or that are mechanically interconnected. The module part and the connecting part forming a safety unit may be made of plastic, and rubber seals are preferably used. In alternative embodiments flanges are used for ensuring encapsulation.

It is particularly an advantage that a safety unit and a safety system respectively is provided which is easy to fabricate, install, which is flexible, control, modify and in particular which satisfies high safety standards or requirements.

It is also an advantage that a safety unit is provided which comprises a connection arrangement which facilitates the use with existing devices of different kinds and which allows interconnection of safety devices, also for expansion purposes.

It is an advantage of the invention that the use of a special, customized, control cabinet is not needed which considerably facilitates installation, makes the safety system less space demanding and saves a lot of time at installation, for modification and also means that the costs for the safety system can be considerably reduced. It is also an advantage that time and costs associated with paper work, documentation and the inspections can be considerably reduced.

Still another significant advantage is that improvements and modifications of a safety system can be made very easily and flexibly. Further yet it is an advantage that the number of cables, and, in addition, the number of wires inside each cable, can be reduced.

The invention claimed is:

1. A programmable safety unit for externally monitoring and controlling safety functions and safety equipment of a hazardous environment comprising at least one of a hazardous machine, a processes, or a material, comprising:
    a programmable safety module configured to monitor and control safety functions and safety equipment of the hazardous environment;
    a connection part; and
    at least two connections to the safety unit such that encapsulation requirements of an installation are fulfilled, the at least two connections being programmable as safe inputs and/or outputs for direct connection to at least a number of the safety functions and/or safety equipment of the hazardous environment, and at least one of the inputs and/or outputs is configured to detect at least one of a short circuit or a wrong connection;
    wherein the programmable safety module and the connection part interconnect such that encapsulation and interconnection is provided that fulfills installation and encapsulation requirements regarding solid particle protection and liquid ingress protection of the installation, and such that the programmable safety module and the connection part are configured to be mounted, demounted, and replaced;
    the programmable safety unit handles all safety related signals to and from the hazardous environment; and
    the programmable safety unit is configured to mount externally to the hazardous environment.

2. The programmable safety unit of claim 1, wherein the connection part and/or safety module includes directly mounted one or more reset and stop push buttons such that the encapsulation requirements are fulfilled.

3. The programmable safety unit of claim 1, wherein the programmable safety module is programmed by a supplier of the programmable safety module.

4. The programmable safety unit of claim 1, wherein the programmable safety module comprises at least one software program installed via a computer or a replaceable memory card, and at least two electronic processors for redundantly executing the at least one software program.

5. The programmable safety unit of claim 1, further comprising standard cable connectors for the at least two connections, the cable connectors including seals such that the encapsulation requirements are fulfilled, and being configured to supply direct-current electric voltage.

6. The programmable safety unit of claim 1, wherein the at least two connections encapsulate and interconnect the programmable safety module and the connection part according to standard requirements.

7. The programmable safety unit of claim 1, wherein the programmable safety unit connects to at least one other programmable safety unit while encapsulation requirements of the hazardous environment are fulfilled, cables between the programmable safety units are connected without seals, and each programmable safety unit comprises an external wall perpendicular to a longitudinal extension of the programmable safety unit and a bottom wall.

8. The programmable safety unit of claim 1, wherein the programmable safety module is adapted to handle safety and/or information signalling associated with safety functions connected to or communicating with the hazardous environment.

9. The programmable safety unit of claim 1, wherein the programmable safety module wirelessly communicates with at least one other programmable safety unit or with the equipment in the hazardous environment.

10. The programmable safety unit of claim 9, wherein the programmable safety module communicates wirelessly according to a protocol adapted for short time communication and for fast detection of data packages.

11. The programmable safety unit of claim 10, wherein lengths of the data packages enable reaction in a reaction time of substantially 20 milliseconds.

12. The programmable safety unit of claim 11, wherein the reaction time is adjustable; the programmable safety module is adapted to detect loss of communication with the at least one other programmable safety unit or the equipment in the hazardous environment; and when loss of communication is detected, the programmable safety unit disables the respective equipment in the hazardous environment.

13. A programmable safety system, comprising a number of programmable safety units according to claim 1, each programmable safety unit being connected to respective hazardous environment equipment.

14. The programmable safety system of claim 13, comprising at least two programmable safety units according to claim 9, wherein the programmable safety modules of the at least two programmable safety units communicate according to a proprietary wireless protocol.

15. The programmable safety system of claim 13, wherein at least one of the number of programmable safety units wirelessly communicates with external equipment for remote monitoring and control.

16. The programmable safety system of claim 13, wherein each of the number of programmable safety units provides status information and transmission time of the status information to at least one other of the number of programmable safety units; and if status information of a programmable safety unit is not received within a predetermined time interval, all safety functions monitored and controlled by the number of programmable safety units of the system are activated.

17. The programmable safety system of claim 13, wherein each of the number of programmable safety units are assigned a respective unique identity.

18. The programmable safety system of claim 13, wherein each of the number of programmable safety units communicates with hazardous environment equipment to be monitored or controlled by cable or wirelessly.

19. A method in a programmable safety system according to claim 13, comprising:
   assigning each programmable safety unit of the programmable safety system at least a unique identity;
   exchanging status messages between all programmable safety units of the programmable safety system, the status messages comprising information about transmission times of the status messages, such that each safety unit receives information about or from all other programmable safety units;
   in each programmable safety unit, monitoring time periods between status messages of other programmable safety units; and
   if a time period between status information messages of any of the other programmable safety units exceeds a predetermined time interval, or if a predetermined number of status messages are not received, stopping all hazardous environment equipment monitored by any the programmable safety units.

20. A programmable safety unit for externally monitoring and controlling safety functions in a hazardous environment including a gate for a person to access to a hazardous machine or hazardous process in the hazardous environment, comprising:
   a programmable safety module configured to monitor and control the complete safety functions of the gate, and configured to stop the hazardous machine or hazardous process to prevent an accident to the person;
   a connection part; and
   at least two connections to the safety unit such that encapsulation requirements of an installation are fulfilled, the at least two connections being programmable as safe inputs and/or outputs for direct connection to at least a number of the complete safety functions for the gate, and at least one of the inputs and/or outputs is configured to detect at least one of a short circuit or a wrong connection; and
   wherein the programmable safety module and the connection part interconnect such that encapsulation and interconnection is provided that fulfills installation and encapsulation requirements of the instillation, and such that the programmable safety module and the connection part are configured to be mounted, demounted, and replaced;
   the programmable safety unit handles all safety related signals to and from the safety functions; and
   the programmable safety unit is configured to mount externally to the hazardous environment.

\* \* \* \* \*